United States Patent
Dick

(10) Patent No.: US 10,605,008 B2
(45) Date of Patent: Mar. 31, 2020

(54) METHODS OF FORMING A CUTTING ELEMENT INCLUDING A MULTI-LAYERED CUTTING TABLE, AND RELATED CUTTING ELEMENTS AND EARTH-BORING TOOLS

(71) Applicant: Baker Hughes, a GE company, LLC, Houston, TX (US)

(72) Inventor: Aaron J. Dick, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 343 days.

(21) Appl. No.: 15/462,249

(22) Filed: Mar. 17, 2017

(65) Prior Publication Data

US 2017/0268297 A1    Sep. 21, 2017

Related U.S. Application Data

(60) Provisional application No. 62/310,236, filed on Mar. 18, 2016.

(51) Int. Cl.
*E21B 10/567*    (2006.01)
*E21B 10/54*    (2006.01)
(Continued)

(52) U.S. Cl.
CPC ............. *E21B 10/567* (2013.01); *B32B 5/16* (2013.01); *B32B 37/06* (2013.01); *B32B 37/10* (2013.01);
(Continued)

(58) Field of Classification Search
CPC .......... E21B 10/567; E21B 10/54; B32B 5/16; B32B 37/06; B32B 37/10; B22F 2998/10; B22F 2005/001; C04B 35/62802
See application file for complete search history.

(56) References Cited

U.S. PATENT DOCUMENTS

| | | |
|---|---|---|
| 4,224,380 A | 9/1980 | Bovenkerk et al. |
| 5,011,514 A | 4/1991 | Cho et al. |
| (Continued) | | |

FOREIGN PATENT DOCUMENTS

| | | |
|---|---|---|
| EP | 2009124 A2 | 12/2008 |
| WO | 2011022421 A2 | 2/2011 |
| WO | 2011031912 A2 | 3/2011 |

OTHER PUBLICATIONS

International Search Report for International Application No. PCT/US2017/022985 dated Jun. 8, 2017, 4 pages.
(Continued)

*Primary Examiner* — Pegah Parvini
(74) *Attorney, Agent, or Firm* — TraskBritt

(57) ABSTRACT

A method of forming a cutting element comprises forming a first material comprising discrete coated particles within a container. The first material is pressed to form a first green structure comprising interbonded coated particles. A second material comprising additional discrete coated particles is formed over the first green structure within the container. The second material is pressed to form a second green structure comprising additional interbonded coated particles. The first green structure and the second green structure are sintered to form a multi-layered cutting table. Additional methods of forming a cutting element, a cutting element, and an earth-boring tool are also described.

27 Claims, 11 Drawing Sheets

(51) Int. Cl.

| | |
|---|---|
| *B22D 7/06* | (2006.01) |
| *C04B 35/63* | (2006.01) |
| *C04B 35/528* | (2006.01) |
| *C04B 37/02* | (2006.01) |
| *C04B 35/5831* | (2006.01) |
| *C04B 35/628* | (2006.01) |
| *B32B 5/16* | (2006.01) |
| *B32B 37/06* | (2006.01) |
| *B32B 37/10* | (2006.01) |
| *B22F 5/00* | (2006.01) |
| *C22C 29/08* | (2006.01) |
| *C22C 29/06* | (2006.01) |
| *B22F 7/06* | (2006.01) |

(52) U.S. Cl.
CPC ........ *C04B 35/528* (2013.01); *C04B 35/5831* (2013.01); *C04B 35/62802* (2013.01); *C04B 35/6303* (2013.01); *C04B 37/021* (2013.01); *E21B 10/54* (2013.01); *B22F 7/064* (2013.01); *B22F 2005/001* (2013.01); *B22F 2998/10* (2013.01); *B32B 2307/58* (2013.01); *B32B 2439/00* (2013.01); *B32B 2479/00* (2013.01); *C04B 2235/3201* (2013.01); *C04B 2235/3203* (2013.01); *C04B 2235/442* (2013.01); *C04B 2235/80* (2013.01); *C04B 2237/363* (2013.01); *C04B 2237/401* (2013.01); *C22C 29/067* (2013.01); *C22C 29/08* (2013.01)

(56) References Cited

U.S. PATENT DOCUMENTS

| | | |
|---|---|---|
| 5,127,923 A | 7/1992 | Bunting et al. |
| 5,151,107 A | 9/1992 | Cho et al. |
| 5,667,028 A | 9/1997 | Truax et al. |
| 6,102,140 A | 8/2000 | Boyce et al. |
| 6,272,753 B2 | 8/2001 | Packer |
| 8,069,936 B2 | 12/2011 | Scott et al. |
| 8,763,731 B2 | 7/2014 | Scott et al. |
| 2002/0020564 A1* | 2/2002 | Fang ............... B22F 1/0003 175/374 |
| 2006/0081681 A1 | 4/2006 | Pipkin |
| 2008/0202821 A1 | 8/2008 | McClain et al. |
| 2008/0302579 A1* | 12/2008 | Keshavan ............... B22F 7/08 175/434 |
| 2010/0206941 A1 | 8/2010 | Egan et al. |
| 2011/0042148 A1* | 2/2011 | Schmitz ............... B24D 99/005 175/428 |
| 2011/0083908 A1* | 4/2011 | Shen ............... B01J 3/062 175/428 |
| 2012/0037431 A1 | 2/2012 | DiGiovanni et al. |
| 2012/0222364 A1 | 9/2012 | Lyons et al. |
| 2014/0116789 A1 | 5/2014 | Sue |
| 2015/0027787 A1 | 1/2015 | Scott et al. |

OTHER PUBLICATIONS

International Written Opinion for International Application No. PCT/US2017/022985 dated Jun. 8, 2017, 10 pages.

* cited by examiner

METHODS OF FORMING A CUTTING ELEMENT INCLUDING A MULTI-LAYERED CUTTING TABLE, AND RELATED CUTTING ELEMENTS AND EARTH-BORING TOOLS

CROSS-REFERENCE TO RELATED APPLICATION

This application claims the benefit of U.S. Provisional Patent Application Ser. No. 62/310,236, filed Mar. 18, 2016, the disclosure of which is hereby incorporated herein in its entirety by this reference.

TECHNICAL FIELD

The disclosure, in various embodiments, relates to methods of forming a cutting element including a multi-layered cutting table, and to related cutting elements and earth-boring tools.

BACKGROUND

Earth-boring tools for forming wellbores in subterranean earth formations may include a plurality of cutting elements secured to a body. For example, fixed-cutter earth-boring rotary drill bits ("drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit. Other earth-boring tools utilizing cutting elements include, for example, core bits, bicenter bits, eccentric bits, hybrid bits (e.g., rolling components in combination with fixed cutting elements), reamers, and casing milling tools.

The cutting elements used in such earth-boring tools often include a volume of polycrystalline diamond ("PCD") material on a substrate. Surfaces of the polycrystalline diamond act as cutting faces of the so-called polycrystalline diamond compact ("PDC") cutting elements. PCD material is material that includes interbonded grains or crystals of diamond material. In other words, PCD material includes direct, inter-granular bonds between the grains or crystals of diamond material. The terms "grain" and "crystal" are used synonymously and interchangeably herein.

PDC cutting elements are generally formed by sintering and bonding together relatively small diamond (synthetic, natural or a combination) grains, termed "grit," under conditions of high temperature and high pressure in the presence of a catalyst (e.g., cobalt, iron, nickel, or alloys and mixtures thereof) to form one or more layers (e.g., a "compact" or "table") of PCD material. These processes are often referred to as high temperature/high pressure (or "HTHP") processes. The supporting substrate may comprise a cermet material (i.e., a ceramic-metal composite material) such as, for example, cobalt-cemented tungsten carbide. In some instances, the PCD material may be formed on the cutting element, for example, during the HTHP process. In such instances, catalyst material (e.g., cobalt) in the supporting substrate may be "swept" into the diamond grains during sintering and serve as a catalyst material for forming the diamond table from the diamond grains. Powdered catalyst material may also be mixed with the diamond grains prior to sintering the grains together in an HTHP process. In other methods, the diamond table may be formed separately from the supporting substrate and subsequently attached thereto.

Unfortunately, during the formation of PDC cutting elements including multiple layers of PDC material movement of the small relatively diamond grains can result in inconsistent interfaces between the layers of PCD material. Such inconsistent interfaces can result in undesirable reliability, durability, and/or performance in the PDC cutting elements during use and operation.

BRIEF SUMMARY

Embodiments of the disclosure relate to methods of forming a cutting element including a multi-layered cutting table, and to related cutting elements and earth-boring tools. For example, in accordance with one embodiment described herein, a method of forming a cutting element comprises disposing a first material comprising discrete coated particles within a container. The first material is pressed to form a first green structure comprising interbonded coated particles. A second material comprising additional discrete coated particles is disposed over the first green structure within the container. The second material is pressed to form a second green structure comprising additional discrete interbonded coated particles. The first green structure and the second green structure are sintered to form a multi-layered cutting table.

In additional embodiments, a method of forming a cutting element comprises disposing a first green structure comprising interbonded coated particles into a container. A second green structure comprising additional interbonded coated particles is disposed over the first green structure within the container. The first green structure and the second green structure are sintered to form a multi-layered cutting table.

In yet additional embodiments, a method of forming a cutting element comprises disposing at least one green structure comprising interbonded coated particles into a container. At least one particulate material is disposed adjacent the at least one green structure within the container. The at least one green structure and the at least one particulate material are sintered to form a multi-layered cutting table.

In further embodiments, a method of forming a cutting element comprises disposing a first material comprising discrete coated particles within a container. The first material is pressed to form a green structure comprising interbonded coated particles. A second material is disposed adjacent the green structure within the container. The green structure and the second material are sintered to form a multi-layered cutting table.

In yet further embodiments, a cutting element comprises a supporting substrate and a multi-layered cutting table attached to an end of the supporting substrate, the multi-layered cutting table formed by a method comprising disposing a first green structure comprising interbonded coated particles within a container, disposing a particulate material adjacent the first green structure within the container, sintering the first green structure and the particulate material.

DETAILED DESCRIPTION

Figure 1A:
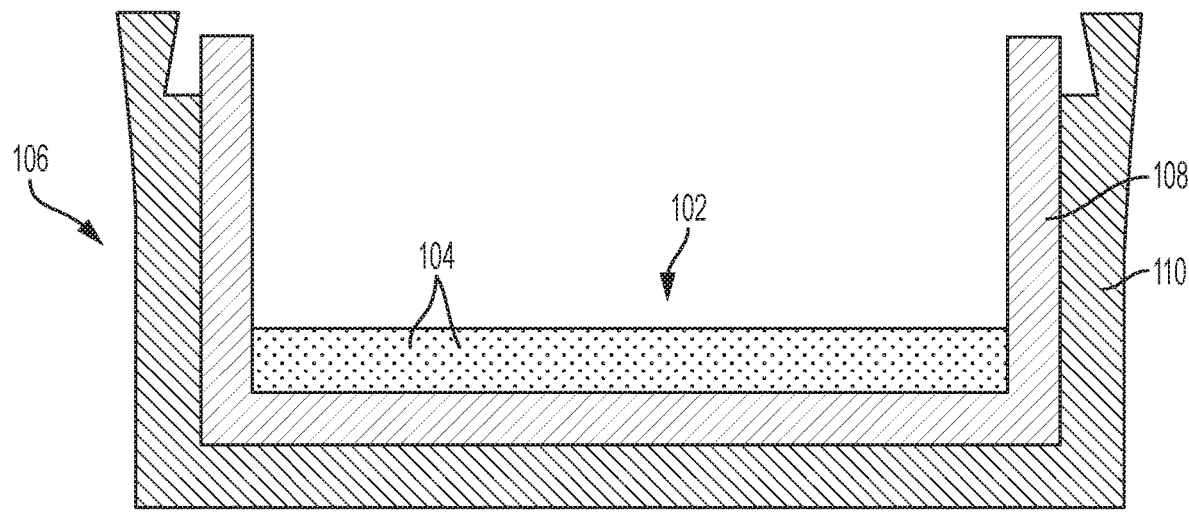
FIGS. 1A through 1F are simplified cross-sectional views of a container in a process of forming a cutting element, in accordance with embodiments of the disclosure.

Methods of forming a cutting element including a multi-layered cutting table are described, as are related cutting elements and earth-boring tools. In some embodiments, a method of forming a cutting element comprises forming a first material including discrete coated particles. The first material may be subjected to at least one pressing process to form a first green structure including interbonded coated particles. A second material including additional discrete coated particles may be formed over the first green structure. The second material may be subjected to at least one additional pressing process to form a second green structure including additional interbonded coated particles. A supporting substrate may be provided over the second green structure. The first green structure, the second green structure, and the supporting substrate may be subjected to at least one HTHP process to form a multi-layered cutting table including a first hard material layer and a second hard material layer. The methods of the disclosure may reduce movement of particles during the formation of a multi-layered cutting table as compared to conventional methods and conventional structures, increasing one or more of the consistency, reliability, durability, and performance of the multi-layered cutting table (and, hence, a cutting element and an earth-boring tool including the multi-layered cutting table) as compared to cutting tables formed by conventional methods.

The following description provides specific details, such as material types and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow for manufacturing a structure (e.g., cutting element), tool, or assembly. Only those process acts and structures necessary to understand the embodiments of the disclosure are described in detail below. Additional acts to form the complete structure, the complete tool, or the complete assembly from various structures may be performed by conventional fabrication techniques. The drawings accompanying the present application are for illustrative purposes only, and are not drawn to scale. Additionally, elements common between figures may retain the same numerical designation.

As used herein, the terms "comprising," "including," "containing," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature, or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "configured" refers to a size, shape, material composition, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

As used herein, the terms "earth-boring tool" and "earth-boring drill bit" mean and include any type of bit or tool used for drilling during the formation or enlargement of a wellbore in a subterranean formation and include, for example, fixed-cutter bits, roller cone bits, percussion bits, core bits, eccentric bits, bicenter bits, reamers, mills, drag bits, hybrid bits (e.g., rolling components in combination with fixed cutting elements), and other drilling bits and tools known in the art.

As used herein, the term "sintering" means temperature driven mass transport, which may include densification and/or coarsening of a particulate component, and typically involves removal of at least a portion of the pores between the starting particles (accompanied by shrinkage) combined with coalescence and bonding between adjacent particles.

FIGS. 1A through 1F are simplified cross-sectional views illustrating embodiments of a method of forming a cutting element including a multi-layered cutting table. With the description provided below, it will be readily apparent to one of ordinary skill in the art that the methods described herein may be used in various devices. In other words, the methods of the disclosure may be used whenever it is desired to form a multi-layered structure, such as a multi-layered structure for an earth-boring tool.

Referring to FIG. 1A, a first material 102 including coated particles 104 may be formed or provided within a container 106. The container 106 may at least partially surround and hold the first material 102. As shown in FIG. 1A, the container 106 may include an inner cup 108, in which the first plurality of the coated particles 104 may be disposed, and a bottom end piece 110 in which the inner cup 108 may be at least partially disposed. In additional embodiments, the bottom end piece 110 may be omitted (e.g., absent). The container 106 may also include additional components (e.g., a top end piece) that may subsequently be coupled to one or more of the inner cup 108 and the bottom end piece 110, as described in further detail below.

The coated particles 104 of the first material 102 may comprise discrete composite particles. As used herein, the term "composite particle" means and includes a particle including at least two constituent materials that remain distinct on a micrometric level while forming a single particle. For example, referring to FIG. 2, which is an enlarged view illustrating how a microstructure of the first material 102 may appear under magnification, each of the coated particles 104 may independently include a core 112 of at least one material at least partially (e.g., substantially) encapsulated (e.g., covered, surrounded, etc.) by a shell 114 (e.g., coating) of at least one other material.

The cores 112 of the coated particles 104 may each independently be formed of and include at least one hard material. As used herein, the term "hard material" means and includes any material having a Knoop hardness value of greater than or equal to about 3,000 Kg$_f$/mm$^2$ (29,420 MPa). Non-limiting examples of hard materials include diamond (e.g., natural diamond, synthetic diamond, combinations thereof, etc.), and cubic boron nitride. Conversely, as used herein, the term "non-hard material" means and includes any material having a Knoop hardness value of less than about 3,000 Kg$_f$/mm$^2$ (29,420 MPa). In some embodiments, each of the cores 112 of the coated particles 104 is formed of and includes diamond.

The shells 114 of the coated particles 104 may each independently be formed of and include at least one material that is compatible with the cores 112 of the coated particles 104, and that facilitates interbonding between the coated particles 104 of the first material 102 as a result at least one pressing process, as described in further detail below. As a non-limiting example, the shells 114 of the coated particles 104 may be formed of and include at least one metal material, such as one or more of an elemental (e.g., pure, non-alloyed) metal, a metal alloy, and an alkali metal carbonate. In some embodiments, the shells 114 of the coated particles 104 are formed of include at least one catalyst metal material. As used herein, the term "catalyst metal material" means and includes any metal material that is capable of substantially catalyzing the formation of inter-granular bonds between grains of hard material during an HTHP process, but at least contributes to the degradation of the inter-granular bonds and granular material under elevated temperatures, pressures, and other conditions that may be encountered in a drilling operation for forming a wellbore in a subterranean formation. As used herein, the term "inter-granular bond" means and includes any direct atomic bond (e.g., covalent, metallic, etc.) between atoms in adjacent grains of hard material. Non-limiting examples of catalyst metal materials for diamond include cobalt (Co), iron (Fe), nickel (Ni), other elements from Group VIIIA of the Periodic Table of the Elements, alloys thereof, alkali metal carbonates (e.g., $Li_2CO_3$, $Na_2CO_3$, $K_2CO_3$, etc.), and combinations thereof. In additional embodiments, the shells 114 of the coated particles 104 include at least one inert metal material. As used herein, the term "inert metal material" means and includes any metal material not capable of substantially catalyzing the formation of inter-granular bonds between grains of hard material during an HTHP process. Non-limiting examples of inert metal materials for diamond include zirconium (Zr), hafnium (Hf), niobium (Nb), tantalum (Ta), alloys thereof, and combinations thereof.

The shells 114 of the coated particles 104 may be substantially homogeneous (e.g., formed of and including a single, substantially uniform material composition), substantially heterogeneous (e.g., formed of and including one or more of a non-uniform material composition, and a plurality of material compositions), or a combination thereof. In some embodiments, the shells 114 of the coated particles 104 are each substantially homogeneous. In additional embodiments, the shell 114 of at least one coated particle 104 of the first material 102 is substantially heterogeneous. A heterogeneous shell 114 may, for example, be formed of and include a stack of at least two different metal materials. A first metal material may at least partially (e.g., substantially) surround the core 112 of the coated particle 104, and a second metal material may at least partially (e.g., substantially) surround the first metal material. For example, a first metal material comprising Co, Fe, Ni, another element from Group VIIIA of the Periodic Table of the Elements, an alloy thereof, or an alkali metal carbonate (e.g., $Li_2CO_3$, $Na_2CO_3$, $K_2CO_3$, etc.) may substantially surround the core 112 of the coated particle 104, and a second metal material different than the first metal material and comprising Co, Fe, Ni, another element from Group VIIIA of the Periodic Table of the Elements, an alloy thereof, or an alkali metal carbonate (e.g., $Li_2CO_3$, $Na_2CO_3$, $K_2CO_3$, etc.) may substantially surround the first metal material. Such a heterogeneous shell 114 may facilitate the formation of a desirable metal alloy from the first metal material and the second metal material during subsequent HTHP processing and/or may facilitate desirable properties (e.g., thermal stability, wear resistance, hardness, etc.) in a multi-layer cutting table resulting from the subsequent HTHP processing, as described in further detail below.

The shells 114 of the coated particles 104 may each independently exhibit any desired thickness able to facilitate interbonding (e.g., metal-metal bonding) between adjacent coated particles 104 of the first material 102 as a result of at least one pressing process (described in further detail below). The thickness (or thicknesses) of the shell 114 of a coated particle 104 may be selected at least partially based on a particle size of the core 112 of the coated particle 104, and on desired permeability characteristics of a first hard material layer to be formed from the first material 102, as described in further detail below. The thickness (or thicknesses) of the shells 114 may correspond to a thickness of a single atomic layer of a material (e.g., a metal material, such as a catalyst metal material or an inert metal material), or may correspond to a thickness of multiple atomic layers of a material. In some embodiments, the shells 114 of the coated particles 104 may each independently exhibit a thickness greater than or equal to about two (2) Angstroms.

The shells 114 of the coated particles 104 may be formed on or over the cores 112 of the coated particles 104 using conventional equipment and conventional processes, which are not described in detail herein. By way of non-limiting example, the shells 114 of the coated particles 104 may be formed on or over the cores 112 of the coated particles 104 using one or more of physical vapor deposition (PVD) (e.g., sputtering, evaporation, ionized PVD, etc.), plasma enhanced physical vapor deposition (PEPVD), chemical vapor deposition (CVD), plasma enhanced chemical vapor deposition (PECVD), atomic layer deposition (ALD), plasma enhanced atomic layer deposition (PEALD), electrolytic plating, electroless plating, spin-coating, dip coating, spray coating, and blanket coating. In other embodiments, mechanical milling processes may be used to form the shells 114 on the cores 112 and form the coated particles 104.

Each of the coated particles 104 of the first material 102 may independently exhibit a desired particle size. The coated particles 104 may comprise, for example, one or more of micro-sized coated particles and nano-sized coated particles. As used herein the term "micro-sized" means and includes a particle size of greater than or equal to about one (1) micrometer (μm), such as from about 1 μm to about 500 μm. As used herein the term "nano-sized" means and includes a particle size of less than 1 μm. In some embodiments, nano-sized coated particles may each independently exhibit a particle size less than or equal to about 500 nanometers (nm), or less than or equal to about 250 nm. In addition, each of the coated particles 104 of the first material 102 may independently exhibit a desired shape, such as at least one of a spherical shape, a hexahedral shape, an ellipsoidal shape, a cylindrical shape, a conical shape, or an irregular shape. In some embodiments, each of the coated particles 104 of the first material 102 exhibits a substantially spherical shape.

The coated particles 104 of the first material 102 may be monodisperse, wherein each of the coated particles 104 exhibits substantially the same material composition, material distribution, size, and shape. Alternatively, the coated particles 104 of the first material 102 may be polydisperse, wherein at least one of the coated particles 104 exhibits one or more of a different material composition, a different material distribution, a different particle size, and/or a different shape than at least one other of the coated particles 104. In some embodiments, the coated particles 104 of the first material 102 are substantially monodisperse. In additional embodiments, the coated particles 104 of the first material 102 are substantially polydisperse.

Referring again to FIG. 1A, in addition to the coated particles 104, the first material 102 may, optionally, include one or more additives. By way of non-limiting example, the first material 102 may include one or more of a binder material and particles of at least one catalyst material. If present, the binder material may comprise any material permitting the first material 102 to retain a desired shape for subsequent processing, and which may be removed (e.g., volatilized off) during subsequent HTHP processing. If present, the particles of catalyst material may comprise any material capable of substantially catalyzing the formation of inter-granular bonds between grains of hard material during an HTHP process, but that at least contributes to the degradation of the inter-granular bonds and granular material under elevated temperatures, pressures, and other conditions that may be encountered in a drilling operation for forming a wellbore in a subterranean formation. In some embodiments, the first material 102 only includes the coated particles 104 (e.g., the first material 102 is substantially free of additives such as binder materials and separate particles of catalyst material).

The first material 102 may be formed or provided within the container 106 to any desired dimensions (e.g., thickness) and in any desired shape. The dimensions and shape of the first material 102 may at least partially depend upon desired dimensions and desired shapes of one or more structures (e.g., a first green structure) to be formed from the first material 102, as described in further detail below. In some embodiments, the first material 102 is formed or provided within the container 106 as a cylindrical column. In additional embodiments, the first material 102 may be formed or provided within the container 106 in a different shape, such as an a tube, rectangular column, a dome, a pyramid, a frusto pyramid, a cone, a frusto cone, a fin, a pillar, a stud, or an irregular shape. Accordingly, the first material 102 may have any desired lateral cross-sectional shape including, but not limited to, a circular shape, an annular shape, a tetragonal shape (e.g., square, rectangular, trapezium, trapezoidal, parallelogram, etc.), a triangular shape, a semicircular shape, an ovular shape, or an elliptical shape. The first material 102 may, for example, be provided a desired shape within the container 106 using one or more features (e.g., features having complementary shapes) of the container 106 and/or using another structure (e.g., a die having a complementary shape) within the container 106.

Figure 1B:
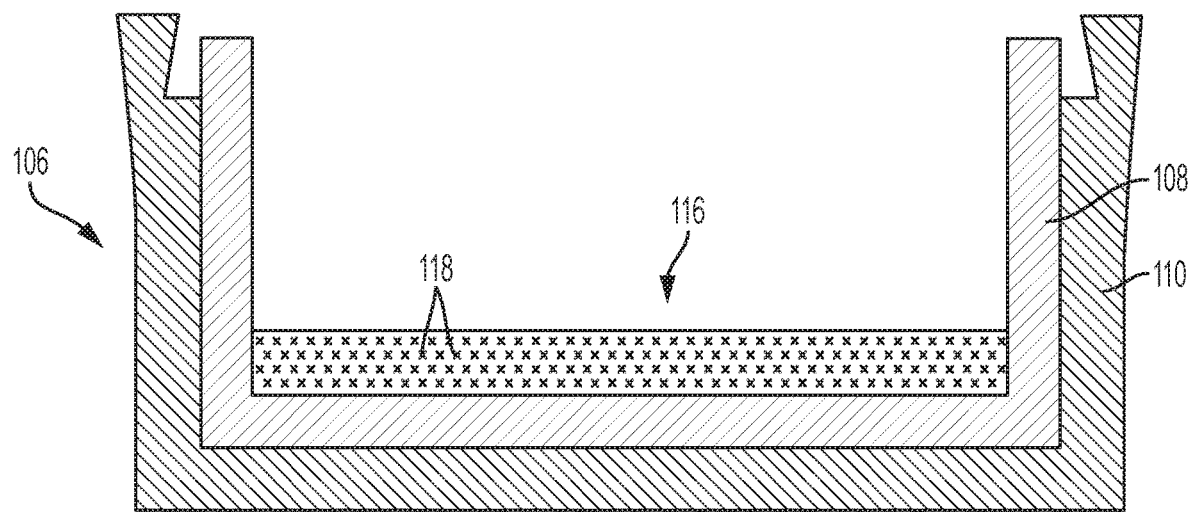
Figure 2:
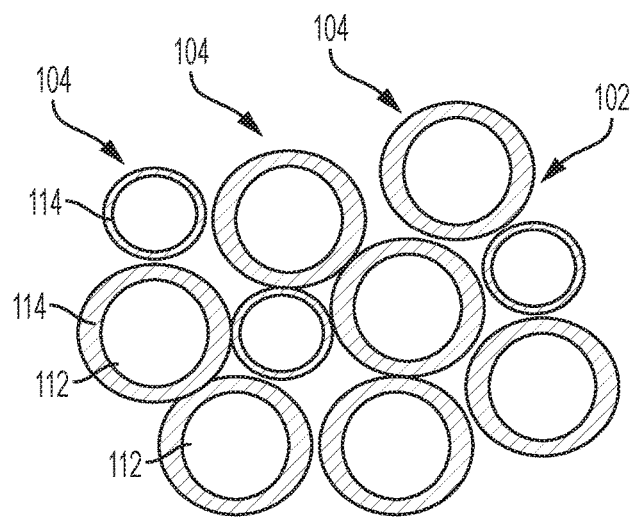
FIG. 2 is a simplified cross-sectional view illustrating how a microstructure of a first material depicted in FIG. 1A may appear under magnification.

Referring next to FIG. 1B, the first material 102 (FIG. 1A) may be subjected to at least one pressing process to form a first green structure 116. As used herein, the term "green" means unsintered. Accordingly, as used herein, a "green structure" means and includes an unsintered structure comprising a plurality of particles, which may be held together by interactions between one or more materials of the plurality of particles and/or another material (e.g., a binder material). The first green structure 116 may include interbonded coated particles 118 formed from the coated particles 104 (FIG. 1A) of the first material 102 (FIG. 1A). For example, referring to FIG. 3, which is an enlarged view illustrating how a microstructure of the first green structure 116 may appear under magnification, the interbonded coated particles 118 may be formed of and include the cores 112 of the coated particles 104 at least partially (e.g., substantially) encapsulated (e.g., covered, surrounded, etc.) within a matrix 119 formed from the shells 114 (FIG. 2) of the coated particles 104 (FIG. 2). The matrix 119 may be formed through interactions (e.g., bonds, such as metal-metal bonds) between the shells 114 of the coated particles 104 resulting from the pressing process. The pressing process may at least partially deform and interconnect the shells 114 of the coated particles 104.

Referring again to FIG. 1B, the first green structure 116 may be formed to exhibit any desired shape and any desired dimensions. The shape and the dimensions of the first green structure 116 may at least partially depend upon desired shapes and desired dimensions of one or more structures (e.g., a first hard material layer) to be formed from the first green structure 116, as described in further detail below. In some embodiments, the first green structure 116 exhibits a substantially planar topography. For example, as shown in FIG. 1B, an upper surface of the first green structure 116 may be substantially planar. In additional embodiments, the first green structure 116 exhibits a substantially non-planar topography including one or more elevated regions and/or one or more recessed regions. For example, an upper surface of the first green structure 116 may exhibit a non-planar shape, such as one or more of an arcuate shape (e.g., a convex shape, a concave shape), a ridged shape, a sinusoidal shape, an angled shape, a jagged shape, a V-shape, a U-shape, and an irregular shape. The shape of the first green structure 116 may substantially similar to the shape of the first material 102 (FIG. 1A). For example, if the first material 102 exhibits a cylindrical column shape, the first green structure 116 may also exhibit a cylindrical column shape. Alternatively, the shape of the first green structure 116 may be different than the shape of the first material 102. For example, if the first material 102 exhibits a cylindrical column shape, the first green structure 116 may exhibit a shape other than a cylindrical column shape. Furthermore, the first green structure 116 may be densified relative to the first material 102 (FIG. 2). For example, referring collectively to FIGS. 2 and 3, interstitial spaces between the cores 112 of the interbonded coated particles 118 (FIG. 3) may be smaller than interstitial spaces between the cores 112 of the coated particles 104 (FIG. 2).

Figure 3:
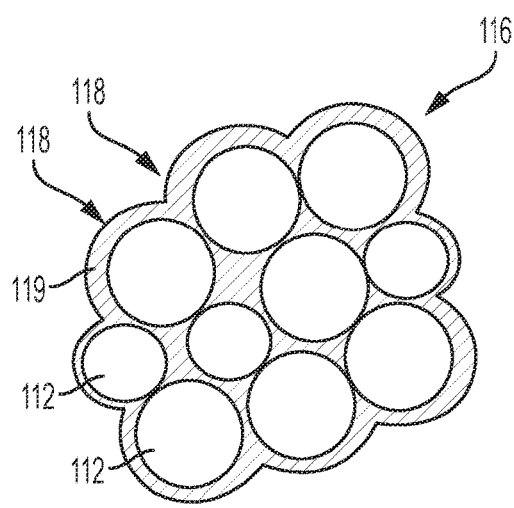
FIG. 3 is a simplified cross-sectional view illustrating how a microstructure of a first green structure depicted in FIG. 1B may appear under magnification.

The pressing process applies compressive pressure to the first material 102 (FIG. 1A) to form the first green structure 116. In some embodiments, the pressing process forms the first green structure 116 without substantially heating (e.g., substantially increasing a temperature of) the first material 102 (e.g., the pressing process may comprise a cold pressing process). In additional embodiments, the pressing process employs heat to form the first green structure 116 from the first material 102. For example, the pressing process may subject the first material 102 to compressive pressure and an elevated temperature less than or equal to about 200° C. to form the first green structure 116. In further embodiments, the pressing process employs a reducing atmosphere to form the first green structure 116 from the first material 102. For example, the pressing process may subject the first material 102 to compressive pressure and in one or more of a hydrogen ($H_2$) atmosphere and an ammonia ($NH_3$) atmosphere to form the first green structure 116. If employed, the reducing atmosphere may remove metal oxides and promote interbonding between the shells 114 (FIG. 2) of the coated particles 104 (FIG. 1A) of the first material 102. The pressing process may employ any pressure facilitating interconnection (e.g., interbonding, such as metal-metal bonding) of the shells 114 (FIG. 2) of the coated particles 104 (FIG. 2) to form the matrix 119 (FIG. 3) of the interbonded coated particles 118 (FIG. 3). By way of non-limiting example, the pressing process may subject the first material 102 to a pressure greater than or equal to about 10 tons per square inch (tons/in$^2$) (greater than or equal to about 138 megapascal (MPa)), such as within a range of from about 10 tons/in$^2$ (about 138 MPa) to about 30 tons/in$^2$ (about 414 MPa). In some embodiments, the pressing process subjects the first material 102 to a pressure of about 10 tons/in$^2$ (about 138 MPa) to form the first green structure 116. The pressing process may employ any pressing device or assembly (e.g., a punch and die device) having a structural configuration (e.g., component sizes, such as a die plate size, a punch size, etc.; component shapes, such as a die plate shape, a punch shape, etc.; etc.) that imparts the first green structure 116 with a desired shape and desired dimensions. As non-limiting example, if it is desired to impart the first green structure 116 with a substantially planar shape, the pressing process may compress the first material 102 using a pressing device exhibiting a substantially planar die plate surface. As another non-limiting example, if it is desired to impart the first green structure 116 with a substantially non-planar shape, the pressing process may compress the first material 102 using a pressing device exhibiting a non-planar die plate surface, and/or using a pressing device including at least one punch facilitating the formation of the substantially non-planar shape.

Figure 1C:
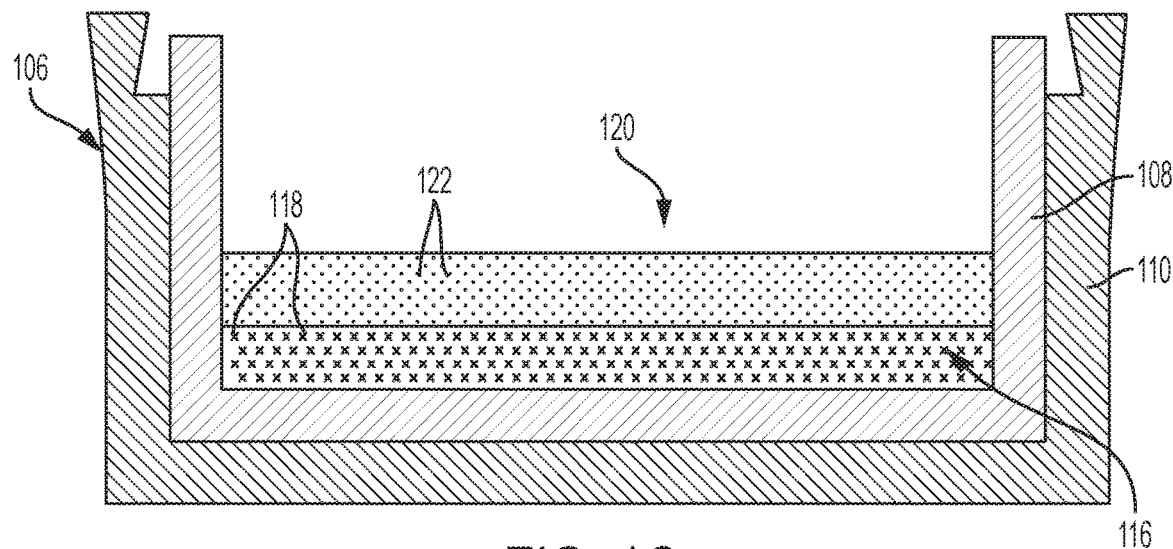

Referring next to FIG. 1C, a second material 120 including additional coated particles 122 may be formed or provided within the container 106. As shown in FIG. 1C, the second material 120 may be formed or provided on or over the first green structure 116. In some embodiments, the second material 120 is formed on an upper surface of the first green structure 116 within the container 106.

The additional coated particles 122 of the second material 120 may comprise discrete composite particles. For example, referring to FIG. 4, which is an enlarged view illustrating how a microstructure of the second material 120 may appear under magnification, each of the additional coated particles 122 may independently include a core 124 of at least one material at least partially (e.g., substantially) encapsulated (e.g., covered, surrounded, etc.) by a shell 126 (e.g., coating) of at least one other material.

The cores 124 of the additional coated particles 122 may each independently be formed of and include at least one hard material. By way of non-limiting example, each of the cores 124 of the additional coated particles 122 may each independently be formed of and include one or more of diamond (e.g., natural diamond, synthetic diamond, combinations thereof, etc.), and cubic boron nitride. The material composition(s) of the cores 124 of the additional coated particles 122 may be substantially the same as the material composition(s) of the cores 112 (FIG. 2) of the coated particles 104 (FIG. 2) of the first material 102 (FIG. 2), or may be different than the material composition(s) of the cores 112 of the coated particles 104 of the first material 102. In some embodiments, each of the cores 124 of the additional coated particles 122 is formed of and includes diamond.

The shells 126 of the additional coated particles 122 may each independently be formed of and include at least one material that is compatible with the cores 124 of the additional coated particles 122, and that facilitates interbonding between the additional coated particles 122 of the second material 120 as a result at least one additional pressing process, as described in further detail below. The material(s) of the shells 126 of the additional coated particles 122 may also facilitate interbonding between the additional coated particles 122 and the interbonded coated particles 118 (FIG. 1C) of the first green structure 116 (FIG. 1C). By way of non-limiting example, the shells 126 of the additional coated particles 122 may be formed of and include at least one metal material, such as one or more of an elemental (e.g., pure, non-alloyed) metal, a metal alloy, and an alkali metal carbonate. In some embodiments, the shells 126 of the additional coated particles 122 are formed of include at least one catalyst metal material, such as one or more of Co, Fe, Ni, another element from Group VIIIA of the Periodic Table of the Elements, alloys thereof, alkali metal carbonates (e.g., $Li_2CO_3$, $Na_2CO_3$, $K_2CO_3$, etc.), and combinations thereof In additional embodiments, the shells 126 of the additional coated particles 122 are formed of include at least one inert metal material, such as one or more of Zr, Hf, Nb, Ta, alloys thereof, and combinations thereof. The material composition(s) of the shells 126 of the additional coated particles 122 may be substantially the same as the material composition(s) of the shells 114 (FIG. 2) of the coated particles 104 (FIG. 2) of the first material 102 (FIG. 2), or may be different than the material composition(s) of the shells 114 of the coated particles 104 of the first material 102.

The shells 126 of the additional coated particles 122 may be substantially homogeneous, substantially heterogeneous, or a combination thereof. In some embodiments, the shells 126 of the additional coated particles 122 are each substantially homogeneous. In additional embodiments, the shell 126 of at least one additional coated particle 122 of the second material 120 is substantially heterogeneous. A heterogeneous shell 126 may, for example, be formed of and include a stack of at least two different metal materials. A first metal material may at least partially (e.g., substantially) surround the core 124 of the additional coated particle 122, and a second metal material may at least partially (e.g., substantially) surround the first metal material. For example, a first metal material comprising Co, Fe, Ni, another element from Group VIIIA of the Periodic Table of the Elements, an alloy thereof, or an alkali metal carbonate (e.g., $Li_2CO_3$, $Na_2CO_3$, $K_2CO_3$, etc.) may substantially surround the core 112 of the coated particle 104, and a second metal material different than the first metal material and comprising Co, Fe, Ni, another element from Group VIIIA of the Periodic Table of the Elements, an alloy thereof, or an alkali metal carbonate (e.g., $Li_2CO_3$, $Na_2CO_3$, $K_2CO_3$, etc.) may substantially surround the first metal material. Such a heterogeneous shell 126 may facilitate the formation of a desirable metal alloy from the first metal material and the second metal material during subsequent HTHP processing and/or may facilitate desirable properties (e.g., thermal stability, wear resistance, hardness, etc.) in a multi-layer cutting table resulting from the subsequent HTHP processing, as described in further detail below.

The shells 126 of the additional coated particles 122 may each independently exhibit any desired thickness able to facilitate interbonding (e.g., metal-metal bonding) between adjacent additional coated particles 122 of the second material 120 as a result of at least one additional pressing process (described in further detail below). The thickness (or thicknesses) of the shell 126 of an additional coated particle 122 may be selected at least partially based on a particle size of the core 124 of the additional coated particle 122, and on desired permeability characteristics of a second hard material layer to be formed from the second material 120, as described in further detail below. The thickness (or thicknesses) of the shells 126 of the additional coated particles 122 may correspond to a thickness of a single atomic layer of a material (e.g., a metal material, such as a catalyst metal material or an inert metal material), or may correspond to a thickness of multiple atomic layers of a material. In some embodiments, the shells 126 of the additional coated particles 122 may each independently exhibit a thickness greater than or equal to about two (2) Angstroms. The thickness (or thicknesses) of the shells 126 of the additional coated particles 122 may be substantially the same as the thickness (or thicknesses) of the shells 114 (FIG. 2) of the coated particles 104 (FIG. 2) of the first material 102 (FIG. 2), or may be different than the thickness (or thicknesses) of the shells 114 of the coated particles 104 of the first material 102.

The shells 126 of the additional coated particles 122 may be formed on or over the cores 124 of the additional coated particles 122 using conventional equipment and conventional processes, which are not described in detail herein. By way of non-limiting example, the shells 126 of the additional coated particles 122 may be formed on or over the cores 124 of the additional coated particles 122 using one or more of PVD (e.g., sputtering, evaporation, ionized PVD, etc.), PEPVD, CVD, PECVD, ALD, PEALD, electrolytic plating, electroless plating, spin-coating, dip coating, spray coating, and blanket coating. In other embodiments, mechanical milling processes may be used to form the shells 126 on the cores 124 and form the additional coated particles 122.

Each of the additional coated particles 122 of the second material 120 may independently exhibit a desired particle size. The additional coated particles 122 may comprise, for example, one or more of micro-sized coated particles and nano-sized coated particles. In addition, each of the additional coated particles 122 of the second material 120 may independently exhibit a desired shape, such as at least one of a spherical shape, a hexahedral shape, an ellipsoidal shape, a cylindrical shape, a conical shape, or an irregular shape. In some embodiments, each of the additional coated particles 122 of the second material 120 exhibits a substantially spherical shape. The particle size(s) and shape(s) of the additional coated particles 122 may be substantially the same as the size(s) and shape(s) of the coated particles 104 (FIG. 2) of the first material 102 (FIG. 2), or the additional coated particles 122 may exhibit one or more of different particle sizes and different shapes than the coated particles 104 of the first material 102. In some embodiments, the additional coated particles 122 of the second material 120 exhibit different particle sizes (e.g., larger particle sizes, smaller particle sizes) than the coated particles 104 of the first material 102. The different particle sizes of the additional coated particles 122 of the second material 120 relative to those of the coated particles 104 of the first material 102 may provide a second hard material layer to be formed from the second material 120 with one or more different properties (e.g., different permeability) than a first hard material layer to be formed from the first green structure 116 (FIG. 1C), as described in further detail below.

The additional coated particles 122 of the second material 120 may be monodisperse, wherein each of the additional coated particles 122 exhibits substantially the same material composition, material distribution, size, and shape. Alternatively, the additional coated particles 122 of the second material 120 may be polydisperse, wherein at least one of the additional coated particles 122 exhibits one or more of a different material composition, a different material distribution, a different particle size, and/or a different shape than at least one other of the additional coated particles 122. In some embodiments, the additional coated particles 122 of the second material 120 are substantially monodisperse. In additional embodiments, the additional coated particles 122 of the second material 120 are substantially polydisperse.

Referring again to FIG. 1C, in addition to the additional coated particles 122, the second material 120 may, optionally, include one or more additives. By way of non-limiting example, the second material 120 may include one or more of a binder material and particles of at least one catalyst material. If present, the binder material may comprise any material permitting the second material 120 to retain a desired shape for subsequent processing, and which may be removed (e.g., volatilized off) before subsequent HTHP processing. If present, the particles of catalyst material may comprise any material capable of substantially catalyzing the formation of inter-granular bonds between grains of hard material during an HTHP process, but that at least contributes to the degradation of the inter-granular bonds and granular material under elevated temperatures, pressures, and other conditions that may be encountered in a drilling operation for forming a wellbore in a subterranean formation. In some embodiments, the second material 120 only includes the additional coated particles 122 (e.g., the second material 120 is substantially free of additives such as binder materials and separate particles of catalyst material).

The second material 120 may be formed or provided within the container 106 to any desired dimensions (e.g., thickness) and in any desired shape. The dimensions and shape of the second material 120 may at least partially depend upon desired dimensions and desired shapes of one or more structures (e.g., a second green structure) to be formed from the second material 120, as described in further detail below. In some embodiments, the second material 120 is formed or provided within the container 106 as a cylindrical column. In additional embodiments, the second material 120 may be formed or provided within the container 106 in a different shape, such as a tube, a rectangular column, a dome, a pyramid, a frusto pyramid, a cone, a frusto cone, a fin, a pillar, a stud, or an irregular shape. Accordingly, the second material 120 may have any desired lateral cross-sectional shape including, but not limited to, a circular shape, an annular shape, a tetragonal shape (e.g., square, rectangular, trapezium, trapezoidal, parallelogram, etc.), a triangular shape, a semicircular shape, an ovular shape, or an elliptical shape. The second material 120 may, for example, be provided a desired shape within the container 106 using one or more features (e.g., features having complementary shapes) of the container 106 and/or using another structure (e.g., the first green structure 116, a die having a complementary shape) within the container 106.

Figure 1D:
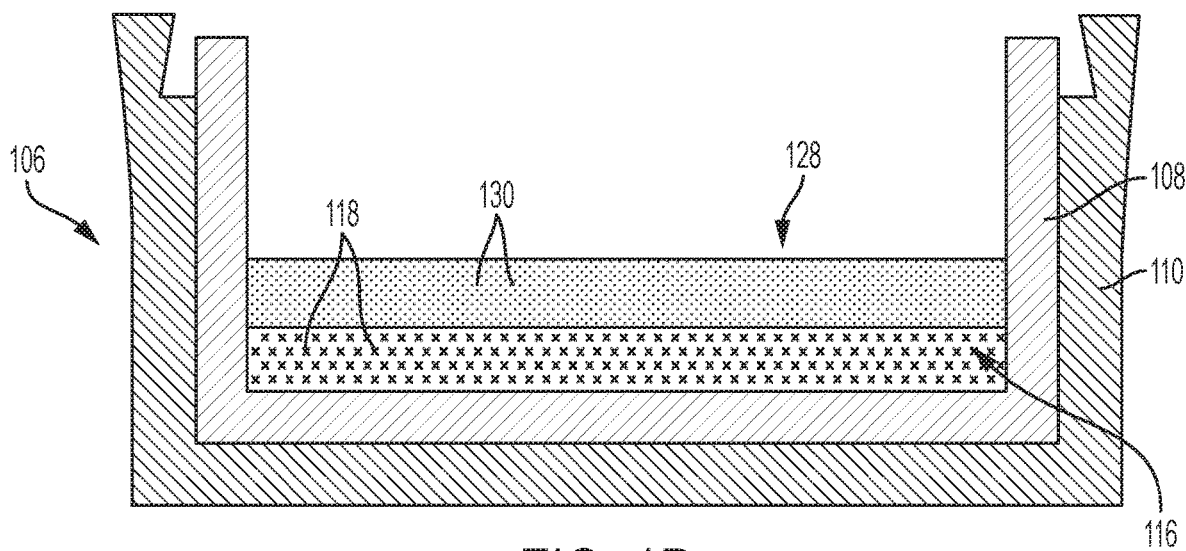
Figure 4:
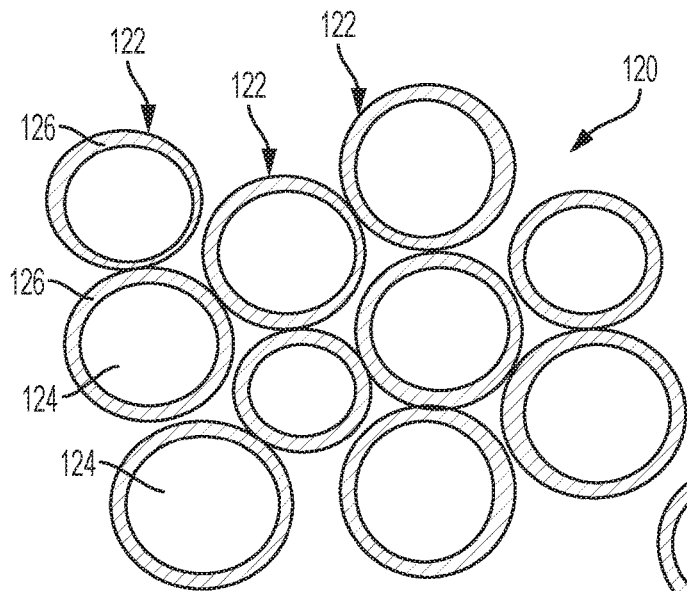
FIG. 4 is a simplified cross-sectional view illustrating how a microstructure of a second material depicted in FIG. 1C may appear under magnification.

Referring next to FIG. 1D, the second material 120 (FIG. 1C) may be subjected to at least one pressing process to form a second green structure 128 on or over the first green structure 116. The second green structure 128 may include additional interbonded coated particles 130 formed from the additional coated particles 122 (FIG. 1C) of the second material 120 (FIG. 1C). For example, referring to FIG. 5, which is an enlarged view illustrating how a microstructure of the second green structure 128 may appear under magnification, the additional interbonded coated particles 130 may be formed of and include the cores 124 of the additional coated particles 122 at least partially (e.g., substantially) encapsulated (e.g., covered, surrounded, etc.) within a matrix 132 formed from the shells 126 (FIG. 4) of the additional coated particles 122 (FIG. 4). The matrix 132 may be formed through interactions (e.g., bonds, such as metal-metal bonds) between the shells 126 of the additional coated particles 122 resulting from the additional pressing process. The additional pressing process may at least partially deform and interconnect the shells 126 of the additional coated particles 104. The additional pressing process may also interconnect a portion of the shells 126 of the additional coated particles 104 (and, hence, a portion of the matrix 132 of the second green structure 128) with the matrix 119 (FIG. 3) of the interbonded coated particles 118 (FIGS. 1D and 3) of the first green structure 116 (FIGS. 1D and 3).

Referring again to FIG. 1D, the second green structure 128 may be formed to exhibit any desired shape and any desired dimensions. The shape and the dimensions of the second green structure 128 may at least partially depend upon desired shapes and desired dimensions of one or more structures (e.g., a second hard material layer) to be formed from the second green structure 128, as described in further detail below. In some embodiments, the second green structure 128 exhibits a substantially planar topography. For example, as shown in FIG. 1D, an upper surface of the second green structure 128 may be substantially planar. In additional embodiments, the second green structure 128 exhibits substantially non-planar topography including one or more elevated regions and/or one or more recessed regions. For example, in additional embodiments, an upper surface of the second green structure 128 exhibits a non-planar shape, such as one or more of an arcuate shape (e.g., a convex shape, a concave shape), a ridged shape, a sinusoidal shape, an angled shape, a jagged shape, a V-shape, a U-shape, and an irregular shape. The shape of the second green structure 128 may be substantially similar to the shape of the second material 120 (FIG. 1C). For example, if the second material 120 exhibits a cylindrical column shape, the second green structure 128 may also exhibit a cylindrical column shape. Alternatively, the shape of the second green structure 128 may be different than the shape of the second material 120. For example, if the second material 120 exhibits a cylindrical column shape, the second green structure 128 may exhibit a shape other than a cylindrical column shape. Furthermore, the second green structure 128 may be densified relative to the second material 120 (FIG. 1C). For example, referring collectively to FIGS. 4 and 5, interstitial spaces between the cores 124 of the additional interbonded coated particles 130 (FIG. 5) may be smaller than interstitial spaces between the cores 124 of the additional coated particles 122 (FIG. 4). The volume of the interstitial spaces in the second green structure 128 may be substantially the same as the volume of the interstitial spaces in the first green structure 116, or the volume of the interstitial spaces in the second green structure 128 may different than (e.g., less than or greater than) the volume of the interstitial spaces in the first green structure 116.

Figure 5:
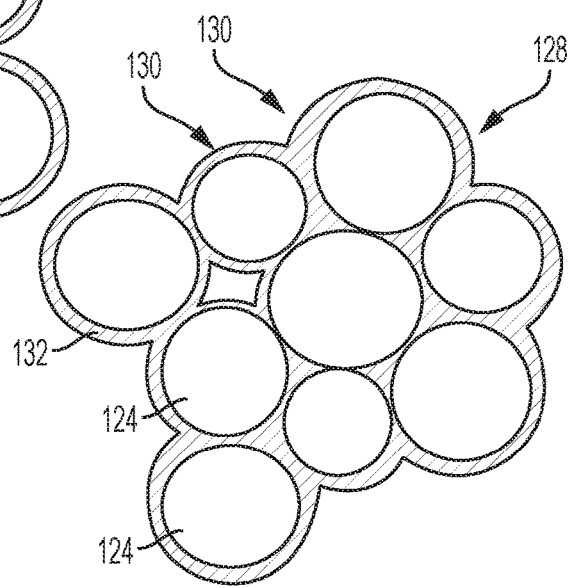
FIG. 5 is a simplified cross-sectional view illustrating how a microstructure of a second green structure depicted in FIG. 1D may appear under magnification.

The additional pressing process applies compressive pressure to the second material 120 (FIG. 1C) to form the second green structure 128. In some embodiments, the additional pressing process forms the second green structure 128 without substantially heating (e.g., substantially increasing a temperature of) the second material 120 (e.g. the pressing process may comprise a cold pressing process). In additional embodiments, the pressing process employs heat to form the second green structure 128 from the second material 120. For example, the additional pressing process may subject the second material 120 to compressive pressure and an elevated temperature less than or equal to about 200° C. to form the second green structure 128. In further embodiments, the additional pressing process employs a reducing atmosphere to form the second green structure 128 from the second material 120. For example, the additional pressing process may subject the second material 120 to compressive pressure and in one or more of an $H_2$ atmosphere and an $NH_3$ atmosphere to form the second green structure 128. If employed, the reducing atmosphere may remove metal oxides and promote interbonding between the shells 126 (FIG. 4) of the additional coated particles 122 (FIG. 1C) of the second material 120. The pressing process may employ any pressure facilitating interconnection (e.g., interbonding, such as metal-metal bonding) of the shells 126 (FIG. 4) of the additional coated particles 122 (FIG. 4) to form the matrix 132 (FIG. 5) of the additional interbonded coated particles 130 (FIG. 5). By way of non-limiting example, the additional pressing process may subject the second material 120 to a pressure greater than or equal to about 10 tons/in$^2$ (greater than or equal to about 138 MPa), such as within a range of from about 10 tons/in² (about 138 MPa) to about 30 tons/in² (about 414 MPa). In some embodiments, the additional pressing process subjects the second material 120 to a pressure of about 10 tons/in² (about 138 MPa) to form the second green structure 128. The additional pressing process may employ any pressing device or assembly (e.g., a punch and die device) having a structural configuration (e.g., component sizes, such as a die plate size, a punch size, etc.; component shapes, such as a die plate shape, a punch shape, etc.; etc.) that imparts the second green structure 128 with a desired shape and desired dimensions. As a non-limiting example, if it is desired to impart the second green structure 128 with a substantially planar shape, the pressing process may compress the second material 120 using a pressing device exhibiting a substantially planar die plate surface. As another non-limiting example, if it is desired to impart the second green structure 128 with a substantially non-planar shape, the pressing process may compress the second material 120 using a pressing device exhibiting a non-planar die plate surface, and/or using a pressing device including at least one punch facilitating the formation of the substantially non-planar shape.

Figure 1E:
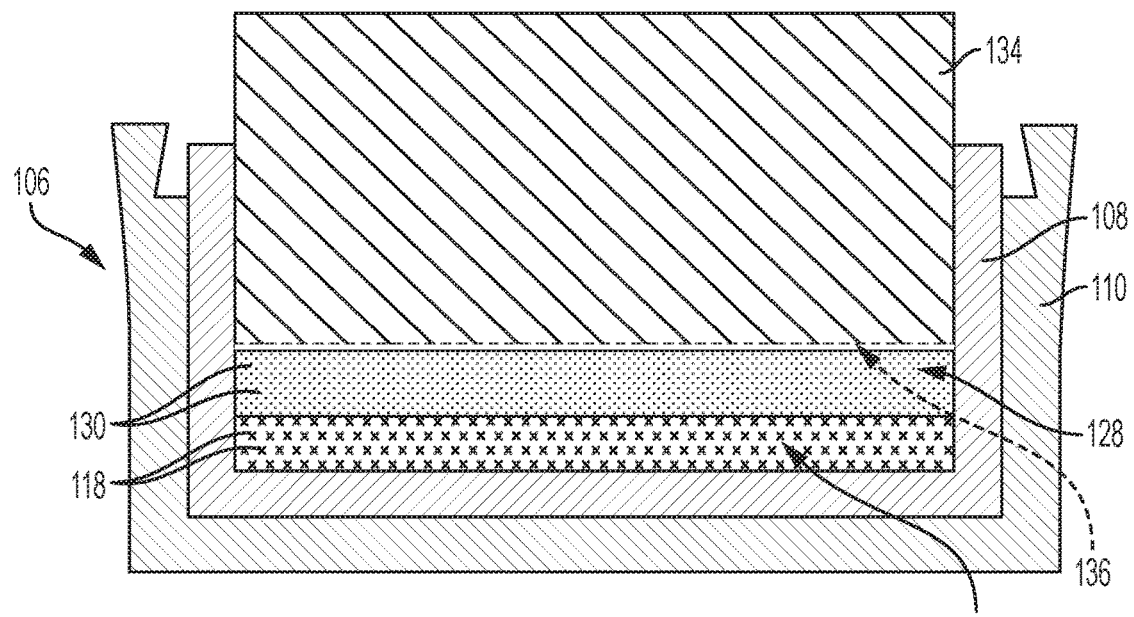

Referring next to FIG. 1E, a supporting substrate 134 may be formed or provided within the container 106. As shown in FIG. 1E, the supporting substrate 134 may be formed or provided on or over the second green structure 128. The supporting substrate 134 may be formed of include a material that is relatively hard and resistant to wear. By way of non-limiting example, the supporting substrate 134 may be formed from and include a ceramic-metal composite material (which is often referred to as a "cermet" material). In some embodiments, the supporting substrate 134 is formed of and includes a cemented carbide material, such as a cemented tungsten carbide material, in which tungsten carbide particles are cemented together in a metallic binder material. As used herein, the term "tungsten carbide" means any material composition that contains chemical compounds of tungsten and carbon, such as, for example, WC, W₂C, and combinations of WC and W₂C. Tungsten carbide includes, for example, cast tungsten carbide, sintered tungsten carbide, and macrocrystalline tungsten carbide. The metallic binder material may include, for example, a catalyst material such as one or more of Co, Fe, Ni, another element from Group VIIIA of the Periodic Table of the Elements, alloys thereof, and combinations thereof. In some embodiments, the supporting substrate 134 is formed of and includes a cobalt-cemented tungsten carbide material. In additional embodiments, the supporting substrate 134 may be omitted (e.g., the first green structure 116 and the second green structure 128 may be subjected to subsequent processing, such as subsequent HTHP processing, in the absence of the supporting substrate 134).

As shown in FIG. 1E, optionally, one or more additional structures 136 may be formed or provided between the second green structure 128 and the supporting substrate 134 within the container 106. The additional structure(s) 136 may, for example, include one or more of at least one additional green structure and at least one catalyst-containing structure. An additional green structure may, for example, exhibit desired dimensions and a desired shape, and may include other interbonded coated particles similar to (e.g., at least exhibiting the same material composition(s) and material distribution(s) as) one or more of the interbonded coated particles 118 (FIG. 1E) of the first green structure 116 (FIG. 1E) and the additional interbonded coated particles 130 (FIG. 1E) of the second green structure 128 (FIG. 1E). A catalyst-containing structure may, for example, comprise one or more of a powder and a solid structure (e.g., a foil, a disc, etc.) formed of and including a catalyst material, such as one or more of Co, Fe, Ni, another element from Group VIIIA of the Periodic Table of the Elements, alloys thereof, and combinations thereof. In some embodiments, the additional structures 136 are omitted (e.g., absent), and the supporting substrate 134 is formed or provided on the second green structure 128.

Figure 1F:
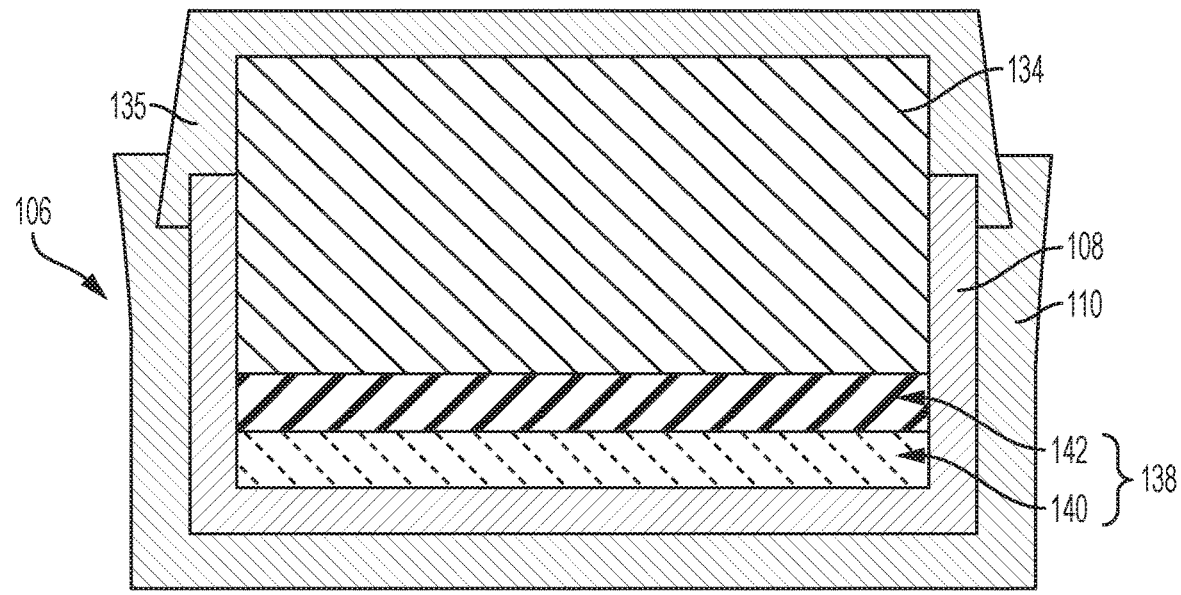

Referring next to FIG. 1F, the first green structure 116 (FIG. 1E), the second green structure 128 (FIG. 1E), the supporting substrate 134, and the additional structures 136 (FIG. 1E) (if any) may be subjected to at least one HTHP process to form a multi-layered cutting table 138. The multi-layered cutting table 138 may comprise a multi-layered polycrystalline compact. As used herein, the term "polycrystalline compact" means and includes a structure comprising a polycrystalline material formed by a process that involves application of pressure (e.g., compaction) to precursor material(s) and/or precursor structure(s) used to form the polycrystalline material. In turn, as used herein, the term "polycrystalline material" means and includes a material comprising a plurality of grains or crystals of the material that are bonded directly together by inter-granular bonds. The crystal structures of the individual grains of the material may be randomly oriented in space within the polycrystalline material.

As shown in FIG. 1F, the multi-layered cutting table 138 may include a first hard material layer 140 and a second hard material layer 142. The first hard material layer 140 may be formed from the first green structure 116 (FIG. 1E), and may include interbonded grains of hard material (e.g., diamond, cubic boron nitride, etc.) formed from the cores 112 (FIG. 3) of the interbonded coated particles 118 (FIG. 3) of the first green structure 116. Interstitial spaces between the interbonded grains of hard material of the first hard material layer 140 may be at least partially filled with catalyst material (e.g., Co, Fe, Ni, another element from Group VIIIA of the Periodic Table of the Elements, alloys thereof, an alkali metal carbonate, combinations thereof, etc.). The second hard material layer 142 may be formed from the second green structure 128 (FIG. 1E), and may include additional interbonded grains of hard material (e.g., diamond, cubic boron nitride, etc.) formed from the cores 112 (FIG. 5) of the additional interbonded coated particles 130 (FIG. 5) of the second green structure 128. Interstitial spaces between the interbonded grains of hard material of the second hard material layer 142 may also be at least partially filled with catalyst material (e.g., Co, Fe, Ni, another element from Group VIIIA of the Periodic Table of the Elements, alloys thereof, an alkali metal carbonate, combinations thereof, etc.). The first hard material layer 140 may be positioned at a longitudinal periphery of the multi-layered cutting table 138, and the second hard material layer 142 may at least partially (e.g., substantially) intervene between the first hard material layer 140 and the supporting substrate 134.

The first hard material layer 140 of the multi-layered cutting table 138 may have a different permeability (e.g., a lower permeability or a higher permeability) than the second hard material layer 142 of the multi-layered cutting table 138. The different permeabilities of the first hard material layer 140 and the second hard material layer 142 may at least partially depend on the particle size(s) of the cores 124 (FIG. 2) of the coated particles 104 (FIG. 2) of the first material 102 (FIG. 2) used to form the first hard material layer 140 relative to the particle size(s) of the cores 124 (FIG. 4) of the additional coated particles 122 (FIG. 4) of the second material 120 (FIG. 4) used to form the second hard material layer 142. For example, if the cores 112 of the coated particles 104 of the first material 102 exhibit a larger average particle size than the cores 124 of the additional coated particles 122 of the second material 120, the first hard material layer 140 may have a relatively higher permeability (e.g., corresponding to a relatively larger volume of interstitial spaces) than the second hard material layer 142. Alternatively, if the cores 112 of the coated particles 104 of the first material 102 exhibit a smaller average particle size than the cores 124 of the additional coated particles 122 of the second material 120, the first hard material layer 140 may have a relatively lower permeability (e.g., corresponding to a relatively smaller volume of interstitial spaces) than the second hard material layer 142. In additional embodiments, the first hard material layer 140 and the second hard material layer 142 may have substantially the same permeability. Controlling the permeability the first hard material layer 140 relative to the second hard material layer 142 (e.g., by selecting the particle size(s) of the cores 112 of the coated particles 104 of the first material 102 relative to the particle size(s) of the cores 124 of the additional coated particles 122 of the second material 120) may permit material (e.g., catalyst material) to be removed from the interstitial spaces of the first hard material layer 140 and the second hard material layer 142 at desired rates relative to one another.

The first hard material layer 140 of the multi-layered cutting table 138 and the second hard material layer 142 of the multi-layered cutting table 138 may each independently be formed to exhibit any desired shape and any desired dimensions. In some embodiments, the shapes of the first hard material layer 140 and the second hard material layer 142 are substantially similar to the shapes of the first green structure 116 (FIG. 1E) and the second green structure 128 (FIG. 1E), respectively. For example, if the first green structure 116 and second green structure 128 exhibit cylindrical column shapes, the first hard material layer 140 and the second hard material layer 142 may also exhibit cylindrical column shapes. In additional embodiments, the shape of the first hard material layer 140 is different than the shape of the first green structure 116, and/or the second hard material layer 142 is different than the shape of the second green structure 128. In addition, the first hard material layer 140 and the second hard material layer 142 may be densified relative to the first green structure 116 and second green structure 128, respectively.

The HTHP process may include subjecting the first green structure 116 (FIG. 1E), the second green structure 128 (FIG. 1E), the supporting substrate 134, and the additional structures 136 (FIG. 1E) (if any) to elevated temperatures and elevated pressures in a heated press for a sufficient time to convert the first green structure 116 and the second green structure 128 into the first hard material layer 140 and the second hard material layer 142, respectively. Although the exact operating parameters of HTHP processes will vary depending on the particular compositions and quantities of the various materials being sintered, pressures in the heated press may be greater than or equal to about 5.0 GPa, and temperatures may be greater than or equal to about 1,400° C. In some embodiments, the pressures in the heated press may be greater than or equal to about 6.5 gigapascals (GPa), such as greater than or equal to about 6.7 GPa. Furthermore, the materials (e.g., the first green structure 116, the second green structure 128, the supporting substrate 134, and the additional structures 136, etc.) being sintered may be held at such temperatures and pressures for a time period between about 30 seconds and about 20 minutes. As shown in FIG. 1F, a top end piece 135 of the container 106 may be coupled (e.g., swage bonded) to one or more of the inner cup 108 and the bottom end piece 110 of the container 106 prior to performing the HTHP process. Accordingly, the container 106 may substantially completely surround and contain each of the first green structure 116, the second green structure 128, the supporting substrate 134, and the additional structures 136 (if any) during the HTHP process.

Following formation, the multi-layered cutting table 138 may be subjected to additional processing. By way of non-limiting example, the multi-layered cutting table 138 may be subjected to at least material removal processes to remove material from at least a portion of one or more of the first hard material layer 140 and the second hard material layer 142. For example, a leaching agent may be used to remove catalyst material from at least a portion of the interstitial spaces among the interbonded grains of the hard material of the first hard material layer 140, and/or to remove catalyst material from at least a portion of the interstitial spaces among the additional interbonded grains of the hard material of the second hard material layer 142. Suitable leaching agents are known in the art and described more fully in, for example, U.S. Pat. No. 5,127,923 to Bunting et al. (issued Jul. 7, 1992), and U.S. Pat. No. 4,224,380 to Bovenkerk et al. (issued Sep. 23, 1980), the disclosure of each of which is incorporated herein in its entirety by this reference. By way of non-limiting example, at least one of aqua regia (i.e., a mixture of concentrated nitric acid and concentrated hydrochloric acid), boiling hydrochloric acid, and boiling hydrofluoric acid may act as a leaching agent. In some embodiments, the leaching agent may comprise hydrochloric acid at a temperature greater than or equal to about 110° C. Surfaces other than those to be leached, such as surfaces of the supporting substrate 134 and/or predetermined surfaces of the multi-layered cutting table 138, may be covered (e.g., coated) with a protective material, such as a polymer material, that is resistant to etching or other damage from the leaching agent. Exposed (e.g., unmasked) surfaces of the multi-layered cutting table 138 to be leached may be brought into contact with the leaching agent by, for example, dipping or immersion. The leaching agent may be provided in contact with the exposed surfaces of the multi-layered cutting table 138 for a period of from about 30 minutes to about 60 hours, depending upon the size of the multi-layered cutting table 138 and a desired depth of material removal.

FIGS. 6A through 6D are simplified cross-sectional views illustrating embodiments of an additional method of forming a cutting element including a multi-layered cutting table. With the description provided below, it will be readily apparent to one of ordinary skill in the art that the methods described herein may be used in various devices. In other words, the methods of the disclosure may be used whenever it is desired to form a multi-layered structure, such as a multi-layered structure for an earth-boring tool.

Figure 6A:
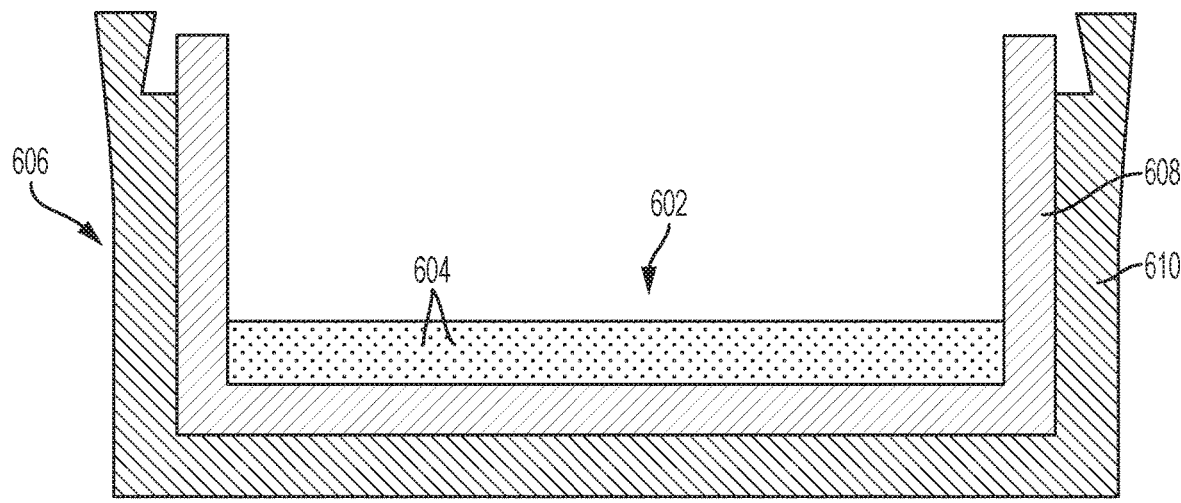
FIGS. 6A through 6D are simplified cross-sectional views of a container in a process of forming a cutting element, in accordance with additional embodiments of the disclosure.

Referring to FIG. 6A, a first material 602 including coated particles 604 may be formed or provided within a container 606. The container 606 may at least partially surround and hold the first material 602. The container 606 may include an inner cup 608 in which the first material 602 may be disposed, and a bottom end piece 610 in which the inner cup 608 may be at least partially disposed. The container 606, including the inner cup 608 and the bottom end piece 610 thereof, may be substantially similar to the container 106 previously described with respect to FIG. 1A.

The first material 602 may be substantially similar to (e.g., have substantially the same material composition, material distribution, dimensions, shape, etc.) the first material 102 previously described with respect to FIG. 1A. The first material 602 may, for example, be formed of and include coated particles 604 substantially similar to (e.g., having substantially the same material composition(s), material distribution(s), dimension(s), shape(s), etc.) the coated particles 104 previously described with respect to FIGS. 1A and 2.

Figure 6B:
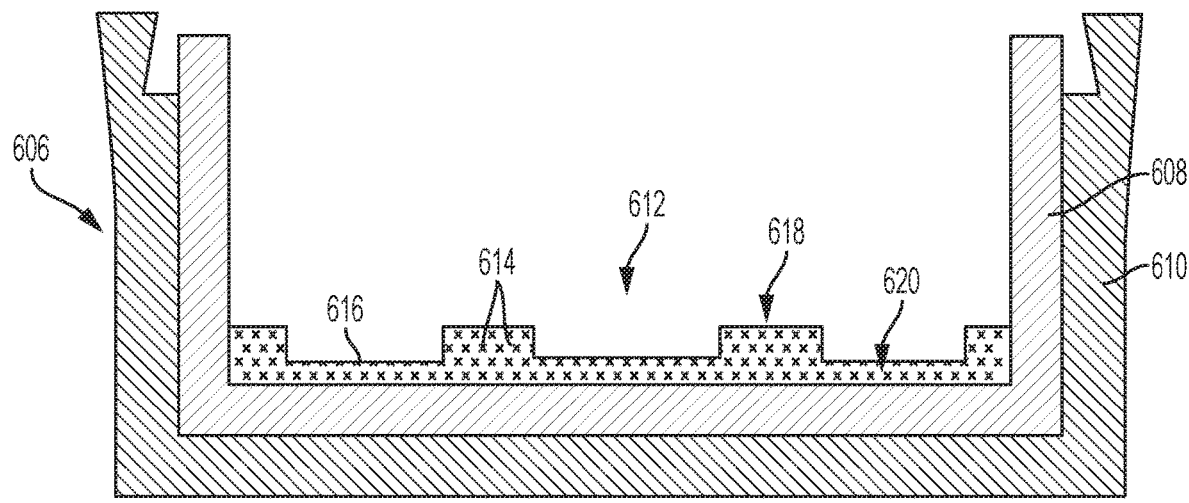

Referring next to FIG. 6B, the first material 602 (FIG. 6A) may be subjected to at least one pressing process to form a green structure 612. The green structure 612 may include interbonded coated particles 614 formed from the coated particles 604 (FIG. 6A) of the first material 602 (FIG. 6A). The green structure 612 may have substantially the same material composition and material distribution as the first green structure 116 previously described with respect to FIG. 1B. The interbonded coated particles 614 of the green structure 612 may, for example, be substantially similar to (e.g., have substantially the same material composition(s), material distribution(s), dimension(s), shape(s), etc.) the interbonded coated particles 118 previously described with respect to FIGS. 1B and 3. In some embodiments, the green structure 612 exhibits substantially non-planar topography including one or more elevated regions and/or one or more recessed regions. For example, as shown in FIG. 6B, the green structure 612 may exhibit a non-planar upper surface 616 at least partially defined by one or more elevated regions 618 of the green structure 612 and one or more recessed regions 620 of the green structure 612. In additional embodiments, the upper surface 616 of the green structure 612 exhibits a different non-planar shape, such as one or more of an arcuate shape (e.g., a convex shape, a concave shape), a sinusoidal shape, an angled shape, a jagged shape, a V-shape, a U-shape, and an irregular shape. In further embodiments, the green structure 612 exhibits a substantially planar topography (e.g., the upper surface 616 of the green structure 612 is substantially planar).

The pressing process applies compressive pressure to the first material 602 (FIG. 6A) to form the green structure 612. In some embodiments, the pressing process forms the green structure 612 without substantially heating (e.g., substantially increasing a temperature of) the first material 602 (e.g. the pressing process may comprise a cold pressing process). In additional embodiments, the pressing process employs heat to form the green structure 612 from the first material 602. For example, the pressing process may subject the first material 602 to compressive pressure and an elevated temperature less than or equal to about 200° C. to form the green structure 612. In further embodiments, the pressing process employs a reducing atmosphere to form the green structure 612 from the first material 602. For example, the pressing process may subject the first material 602 to compressive pressure and in one or more of an $H_2$ atmosphere and an $NH_3$ atmosphere to form the green structure 612. The pressing process may employ any pressure facilitating interconnection (e.g., interbonding, such as metal-metal bonding) of shells of the coated particles 604 (FIG. 6A) to form a matrix of the interbonded coated particles 614. By way of non-limiting example, the pressing process may subject the first material 602 to a pressure greater than or equal to about 10 tons/in$^2$ (greater than or equal to about 138 MPa), such as within a range of from about 10 tons/in$^2$ (138 MPa) to about 30 tons/in$^2$ (414 MPa). In some embodiments, the pressing process subjects the first material 602 to a pressure of about 10 tons/in$^2$ (about 138 MPa) to form the green structure 612. The pressing process may employ any press device (e.g., punch device) structural configuration (e.g., size, shape, etc.) that imparts the green structure 612 with a desired shape and desired dimensions. As a non-limiting example, the pressing process may compress the first material 602 using a press device exhibiting a substantially non-planar surface to impart the green structure 612 with the elevated regions 618 and the recessed regions 620 defining the non-planar upper surface 616 shown in FIG. 6B. As another non-limiting example, if it is desired to impart the green structure 612 with a substantially planar shape, the pressing process may compress the first material 602 using a press device exhibiting a substantially planar surface.

Figure 6C:
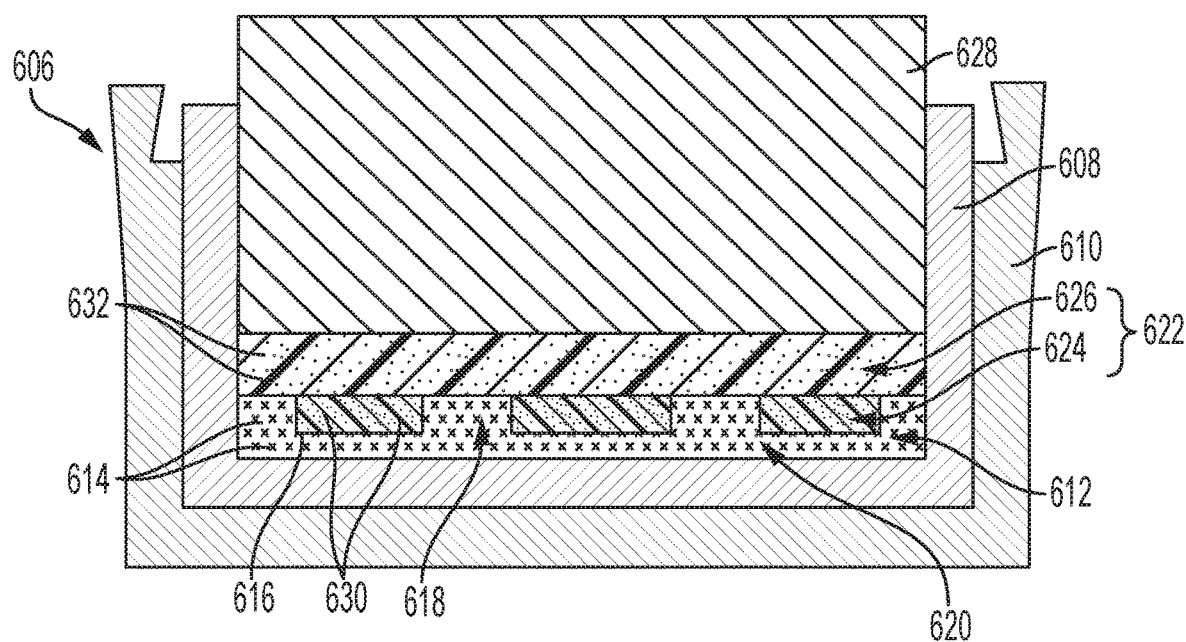

Referring next to FIG. 6C, at least one additional material 622 and a supporting substrate 628 may be formed or provided within the container 606. The additional material 622 may be formed or provided on or over the green structure 612, and the supporting substrate 628 is formed or provided on or over the additional material 622. In some embodiments, the additional material 622 is provided on the upper surface 616, and the supporting substrate 628 is provided on an upper surface of the additional material 622.

The additional material 622 may be formed of and include at least one particulate material. In some embodiments, the additional material 622 is formed of and includes one or more particulate materials including discrete composite particles. For example, as shown in FIG. 6C, the additional material 622 may include a second material 624 including discrete coated particles 630, and a third material 626 include additional discrete coated particles 632. The second material 624 may, for example, be provided within openings in the green structure 612 defined by the elevated regions 618 and the recessed regions 620, and the third material 626 may be provided on or over the green structure 612 and the second material 624. Each of discrete coated particles 630 of the second material 624 and each of the additional discrete coated particles 632 of the third material 626 may independently have a material composition and a material distribution substantially similar to the coated particles 104 previously described with respect to FIGS. 1A and 2. For example, each of the discrete coated particles 630 of the second material 624 and each of the additional discrete coated particles 632 of the third material 626 may independently exhibit a core comprising at least one hard material (e.g., diamond, cubic boron nitride, etc.), and a shell comprising at least one different material (e.g., a metal material, such as a metal catalyst material, an alkali metal carbonate material, an inert metal material, etc.) encapsulating the core. In some embodiments, each of the discrete coated particles 630 of the second material 624 and each of the additional discrete coated particles 632 of the third material 626 exhibit substantially the same material composition and material distribution. In additional embodiments, one or more of the discrete coated particles 630 of the second material 624 exhibit at least one of a different material composition and a different material distribution than at least one of the additional discrete coated particles 632 of the third material 626. In addition, each of the discrete coated particles 630 of the second material 624 and each of the additional discrete coated particles 632 of the third material 626 may independently exhibit desired dimensions and a desired shape. In some embodiments, an average particle size of the discrete coated particles 630 of the second material 624 is different than (e.g., larger than, smaller than) an average particle size of the additional discrete coated particles 632 of the third material 626. In additional embodiments, an average particle size of the discrete coated particles 630 of the second material 624 is substantially the same as an average particle size of the additional discrete coated particles 632 of the third material 626.

In further embodiments, the additional material 622 is formed of and includes one or more particulate materials including discrete non-composite particles. By way of non-limiting example, the additional material 622 may include at least one particulate material comprising discrete particles of hard material (e.g., diamond, cubic boron nitride, etc.) not encapsulated (e.g., not surrounded, not covered, etc.) by a shell of another material. Put another way, the additional material 622 may include one or more particulate materials including uncoated particles of hard material. For example, referring to FIG. 6C, the second material 624 may be formed of and include discrete uncoated particles of hard material instead of or in combination with the discrete coated particles 630, and/or and the third material 626 may be formed of and include discrete uncoated particles of hard material instead of or in combination with the additional discrete coated particles 632.

The supporting substrate 628 may be substantially similar to (e.g., have substantially the same material composition, material distribution, dimensions, shape, etc.) the supporting substrate 134 previously described with respect to FIG. 1E. In additional embodiments, the supporting substrate 628 may be omitted (e.g., the green structure 612 and the additional material(s) 622, such as the second material 624 and the third material 626, may be subjected to subsequent processing, such as subsequent HTHP processing, in the absence of the supporting substrate 628).

Figure 6D:
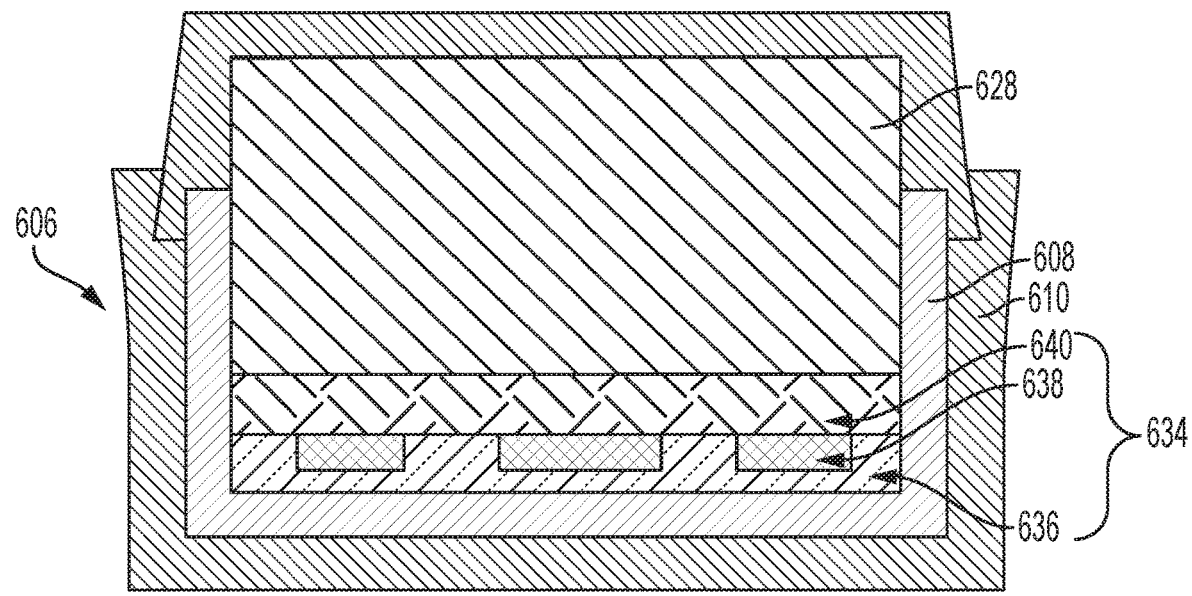

Referring next to FIG. 6D, the green structure 612 (FIG. 6C), additional material(s) 622 (e.g., the second material 624 and the third material 626) (FIG. 6C), and the supporting substrate 628 (FIG. 7A) (if any) may be subjected to at least one HTHP process to form a multi-layered cutting table 634. The multi-layered cutting table 634 may, for example, include a first hard material layer 636, a second hard material layer 638, and a third hard material layer 640. The first hard material layer 636 may be formed from the green structure 612, and may include interbonded grains of hard material (e.g., diamond, cubic boron nitride, etc.) formed from cores of the interbonded coated particles 614 (FIG. 6C) of the green structure 612. The second hard material layer 638 may be formed from the second material 624, and may include interbonded grains of hard material (e.g., diamond, cubic boron nitride, etc.) formed from cores of the discrete coated particles 630 (FIG. 6C) of the second material 624. The third hard material layer 640 may be formed from the third material 626, and may include interbonded grains of hard material (e.g., diamond, cubic boron nitride, etc.) formed from cores of the additional discrete coated particles 632 (FIG. 6C) of the third material 626. Shapes and positions of the first hard material layer 636, the second hard material layer 638, and the third hard material layer 640 may correspond to the shapes and positions of the green structure 612, the second material 624, and the third material 626, respectively. The first hard material layer 636, the second hard material layer 638, and the third hard material layer 640 of the multi-layered cutting table 634 may be densified relative to green structure 612, the second material 624, and the third material 626, respectively. The first hard material layer 636, the second hard material layer 638, and the third hard material layer 640 of the multi-layered cutting table 634 may have substantially the same permeability as one another, or one or more of the first hard material layer 636, the second hard material layer 638, and the third hard material layer 640 may have a different permeability than one or more other of the first hard material layer 636, the second hard material layer 638, and the third hard material layer 640. In addition, interstitial spaces between interbonded grains of hard material of each of the first hard material layer 636, the second hard material layer 638, and the third hard material layer 640 may be at least partially filled with catalyst material (e.g., Co, Fe, Ni, another element from Group VIIIA of the Periodic Table of the Elements, alloys thereof, an alkali metal carbonate, combinations thereof, etc.).

The HTHP process used to form the multi-layered cutting table 634 may also be substantially similar (e.g., employ substantially the same temperature, pressure, duration, etc.) as the HTHP process used to the form the multi-layered cutting table 138 previously described with respect to FIG. 1F.

Following formation, the multi-layered cutting table 634 may be subjected to additional processing. By way of non-limiting example, the multi-layered cutting table 634 may be subjected to at least material removal processes to remove material from at least a portion of one or more of the first hard material layer 636, the second hard material layer 638, and the third hard material layer 640. For example, a leaching agent may be used to remove catalyst material from at least a portion of the interstitial spaces among the inter-bonded grains of the hard material of one or more of the first hard material layer 636, the second hard material layer 638, and the third hard material layer 640. The leaching process may be substantially similar to the leaching process previously described herein in relation to the post-formation processing of the multi-layered cutting table 138 (FIG. 1F).

Figure 7A:
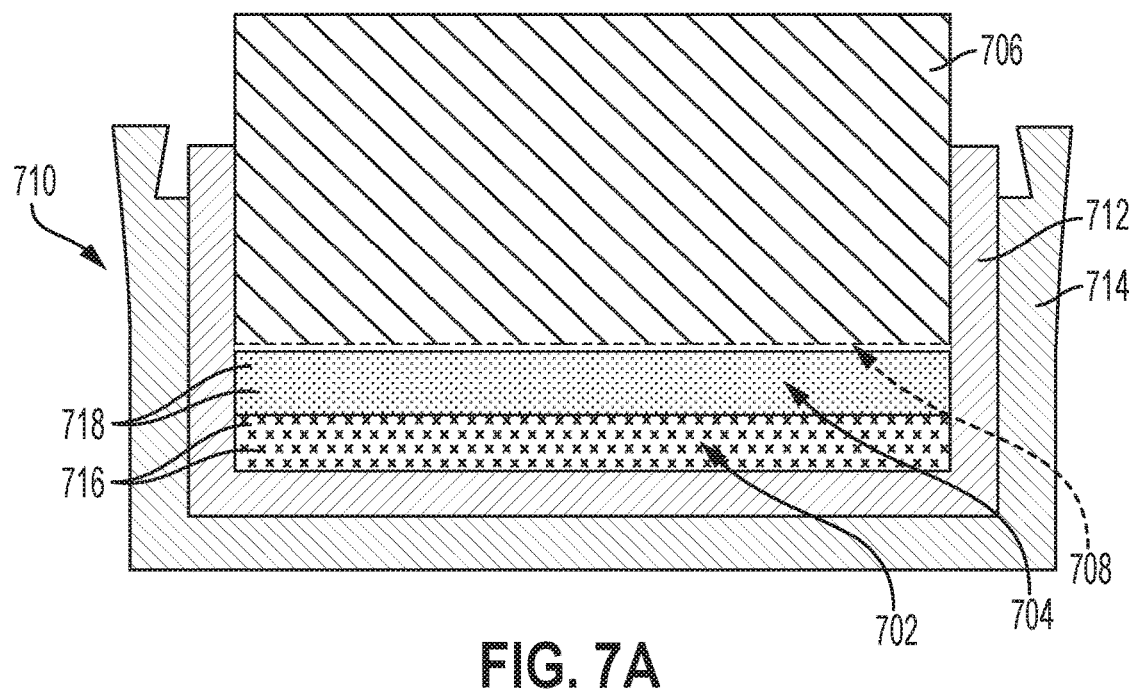
FIGS. 7A and 7B are simplified cross-sectional views of a container in a process of forming a cutting element, in accordance with further embodiments of the disclosure.
Figure 7B:
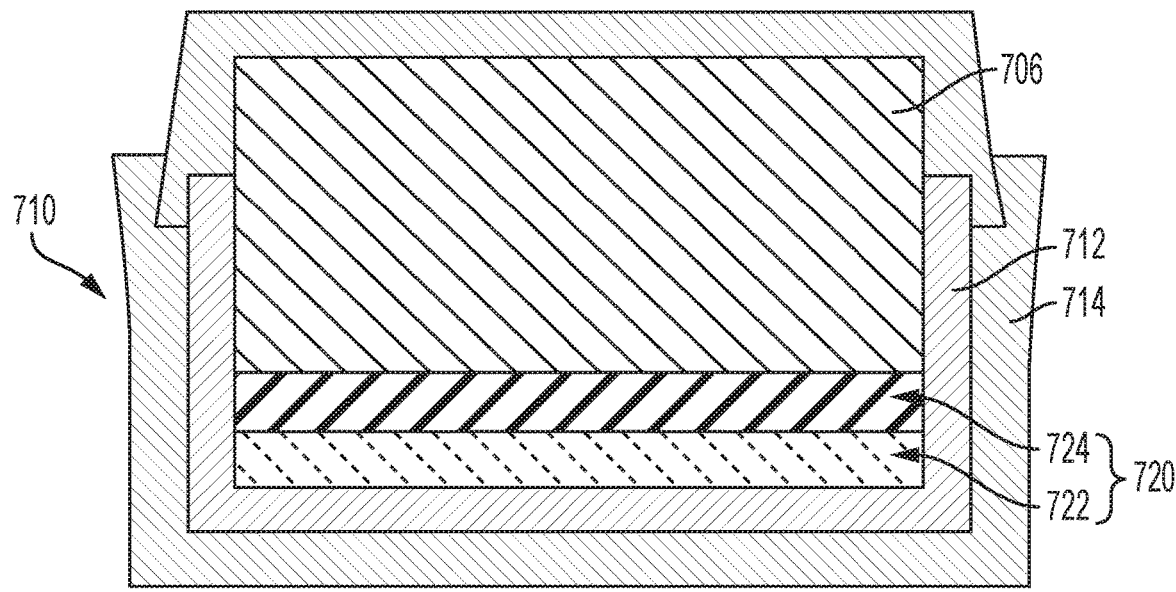

FIGS. 7A and 7B are simplified cross-sectional views illustrating embodiments of an additional method of forming a cutting element including a multi-layered cutting table. With the description provided below, it will be readily apparent to one of ordinary skill in the art that the methods described herein may be used in various devices. In other words, the methods of the disclosure may be used whenever it is desired to form a multi-layered structure, such as a multi-layered structure for an earth-boring tool.

Referring to FIG. 7A, a first separately-formed green structure 702, a second separately-formed green structure 704, a supporting substrate 706, and, optionally, at least one additional structure 708 may be provided into a container 710. The second separately-formed green structure 704 may be positioned on or over the first separately-formed green structure 702, and the supporting substrate 706 may be positioned on or over the second separately-formed green structure 704. The additional structure 708, if included, may be positioned between the second separately-formed green structure 704 and the supporting substrate 706. The container 710 may at least partially surround and hold the first separately-formed green structure 702, the second separately-formed green structure 704, the supporting substrate 706, and the additional structure 708 (if any). The container 710 may include an inner cup 712 in which the first separately-formed green structure 702, the second separately-formed green structure 704, the supporting substrate 706, and the additional structure 708 (if any) may be disposed, and a bottom end piece 714 in which the inner cup 712 may be at least partially disposed. The container 710, including the inner cup 712 and the bottom end piece 714 thereof, may be substantially similar to the container 106 previously described with respect to FIG. 1A.

The first separately-formed green structure 702 may be substantially similar to (e.g., have substantially the same material composition, material distribution, dimensions, shape, etc.) the first green structure 116 previously described with respect to FIG. 1B. The first separately-formed green structure 702 may, for example, be formed of and include interbonded coated particles 716 substantially similar to (e.g., having substantially the same material composition(s), material distribution(s), dimension(s), shape(s), etc.) the interbonded coated particles 118 previously described with respect to FIGS. 1B and 3. In some embodiments, the first separately-formed green structure 702 exhibits a substantially planar topography. For example, as shown in FIG. 7A, an upper surface of the first separately-formed green structure 702 may be substantially planar. In additional embodiments, the first separately-formed green structure 702 exhibits a substantially non-planar topography including one or more elevated regions and/or one or more recessed regions. For example, an upper surface of the first separately-formed green structure 702 may exhibit a non-planar shape, such as one or more of an arcuate shape (e.g., a convex shape, a concave shape), a ridged shape, a sinusoidal shape, an angled shape, a jagged shape, a V-shape, a U-shape, and an irregular shape.

The first separately-formed green structure 702 may be formed with or without the use of a separate container. In some embodiments, the first separately-formed green structure 702 is formed in a separate container, such as a separate container operatively associated with a pressing device (e.g., a punch and die device), using a process substantially similar to that previously described herein with respect to FIGS. 1A and 1B. In additional embodiments, the first separately-formed green structure 702 is formed without the use of a separate container. For example, the first separately-formed green structure 702 may be formed by subjecting a first material substantially similar to the first material 102 previously described with respect to FIG. 1A to a pressing process without previously providing or forming the first material within a separate container (e.g., the first material may be compressed using a pressing device without being located in a container).

The second separately-formed green structure 704 may be substantially similar to (e.g., have substantially the same material composition, material distribution, dimensions, shape, etc.) the second green structure 128 previously described with respect to FIG. 1D. The second separately-formed green structure 704 may, for example, be formed of and include additional interbonded coated particles 718 substantially similar to (e.g., having substantially the same material composition(s), material distribution(s), dimension(s), shape(s), etc.) the additional interbonded coated particles 130 previously described with respect to FIGS. 1D and 5. In some embodiments, the second separately-formed green structure 704 exhibits a substantially planar topography. For example, as shown in FIG. 7A, an upper surface of the second separately-formed green structure 704 may be substantially planar. In additional embodiments, the second separately-formed green structure 704 exhibits a substantially non-planar topography including one or more elevated regions and/or one or more recessed regions. For example, an upper surface of the second separately-formed green structure 704 may exhibit a non-planar shape, such as one or more of an arcuate shape (e.g., a convex shape, a concave shape), a ridged shape, a sinusoidal shape, an angled shape, a jagged shape, a V-shape, a U-shape, and an irregular shape.

The second separately-formed green structure 704 may be formed with or without the use of a separate container. In some embodiments, the second separately-formed green structure 704 is formed in a separate container, such as a separate container operatively associated with a pressing device (e.g., a punch and die device) using a process substantially similar to that previously described herein with respect to FIGS. 1A and 1B (e.g., the process of forming the first green structure 116) or with respect to FIGS. 1A through 1D (e.g., the process of forming the first green structure 116 and the second green structure 128). In additional embodiments, the second separately-formed green structure 704 is formed without the use of a separate container. For example, the second separately-formed green structure 704 may be formed by subjecting a second material substantially similar to the second material 120 previously described with respect to FIG. 1C to a pressing process without previously providing or forming the second material within a separate container (e.g., the second material may be compressed using a pressing device without being located in a container).

The first separately-formed green structure 702 and the second separately-formed green structure 704 may be provided into the container 710 with one another, or may be provided into the container 710 separate from one another. In some embodiments, the first separately-formed green structure 702 and the second separately-formed green structure 704 are provided into the container 710 with one another (e.g., as a single structure). For example, the first separately-formed green structure 702 and the second separately-formed green structure 704 may be coupled (e.g., bonded) to one another before being provided into the container 710. In additional embodiments, the first separately-formed green structure 702 and the second separately-formed green structure 704 are provided into the container 710 separate from one another (e.g., as separate structures). For example, the first separately-formed green structure 702 and the second separately-formed green structure 704 may be discrete (e.g., separate, unconnected, detached, etc.) from one another prior to being provided into the container 710.

The supporting substrate 706 may be substantially similar to (e.g., have substantially the same material composition, material distribution, dimensions, shape, etc.) the supporting substrate 134 previously described with respect to FIG. 1E. In additional embodiments, the supporting substrate 706 may be omitted (e.g., the first separately-formed green structure 702 and the second separately-formed green structure 704 may be subjected to subsequent processing, such as subsequent HTHP processing, in the absence of the supporting substrate 706).

The additional structure(s) 708, if any, may have substantially the same material composition and material distribution as one or more of the first material 102 previously described with respect to FIG. 1A, and the additional structure(s) 136 previously described with respect to FIG. 1E. For example, the additional structure(s) 708, if any, may comprise one or more of at least one particulate material formed of and including discrete coated particles, at least one additional separately-formed green structure formed of and including interconnected coated particles, and at least one catalyst-containing structure. In some embodiments, the additional structures 708 are omitted (e.g., absent), and the supporting substrate 706 is provided on the second separately-formed green structure 704.

Referring next to FIG. 7B, the first separately-formed green structure 702 (FIG. 7A), the second separately-formed green structure 704 (FIG. 7A), the supporting substrate 706 (FIG. 7A) (if any), and the additional structure(s) 708 (FIG. 7A) (if any) may be subjected to at least one HTHP process to form a multi-layered cutting table 720. The multi-layered cutting table 720 may be substantially similar to (e.g., have substantially the same material composition, material distribution, dimensions, shape, etc.) the multi-layered cutting table 138 previously described with respect to FIG. 1F. The multi-layered cutting table 720 may, for example, include a first hard material layer 722 substantially similar to the first hard material layer 140 previously described with respect to FIG. 1F, and a second hard material layer 724 substantially similar to the second hard material layer 142 previously described with respect to FIG. 1F. The HTHP process used to form the multi-layered cutting table 720 may also be substantially similar (e.g., employ substantially the same temperature, pressure, duration, etc.) as the HTHP process used to the form the multi-layered cutting table 138.

Following formation, the multi-layered cutting table 720 may be subjected to additional processing. By way of non-limiting example, the multi-layered cutting table 720 may be subjected to at least one material removal process to remove material from at least a portion of one or more of the first hard material layer 722 and the second hard material layer 724. For example, a leaching agent may be used to remove catalyst material from at least a portion of the interstitial spaces among the interbonded grains of the hard material of the first hard material layer 722, and/or to remove catalyst material from at least a portion of the interstitial spaces among the additional interbonded grains of the hard material of the second hard material layer 724. The leaching process may be substantially similar to the leaching process previously described herein in relation to the post-formation processing of the multi-layered cutting table 138 (FIG. 1F).

Figure 8A:
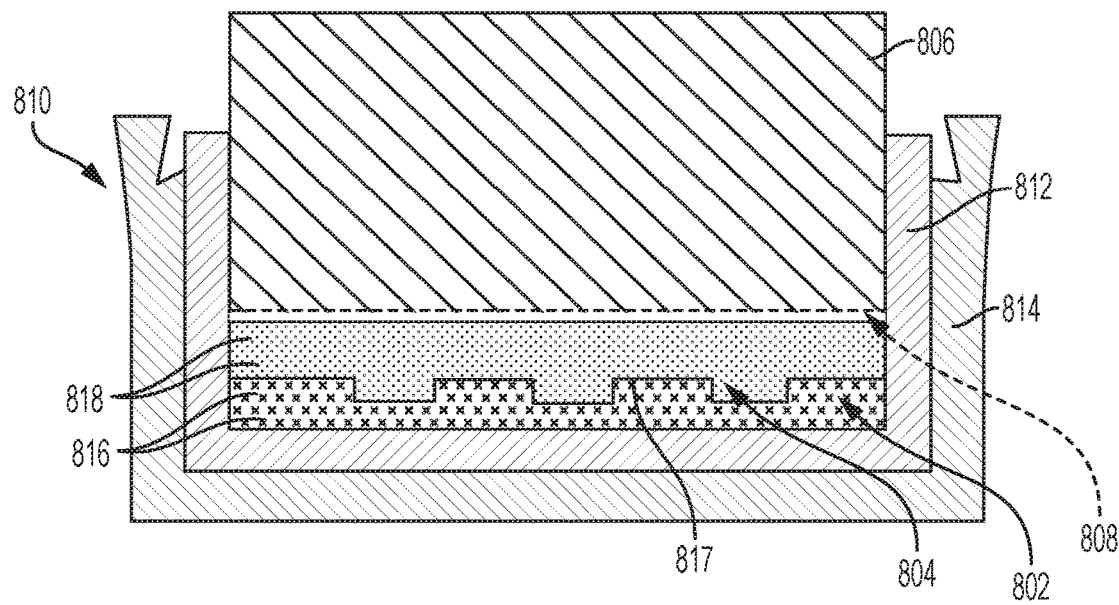
FIGS. 8A and 8B are simplified cross-sectional views of a container in a process of forming a cutting element, in accordance with yet further embodiments of the disclosure.
Figure 8B:
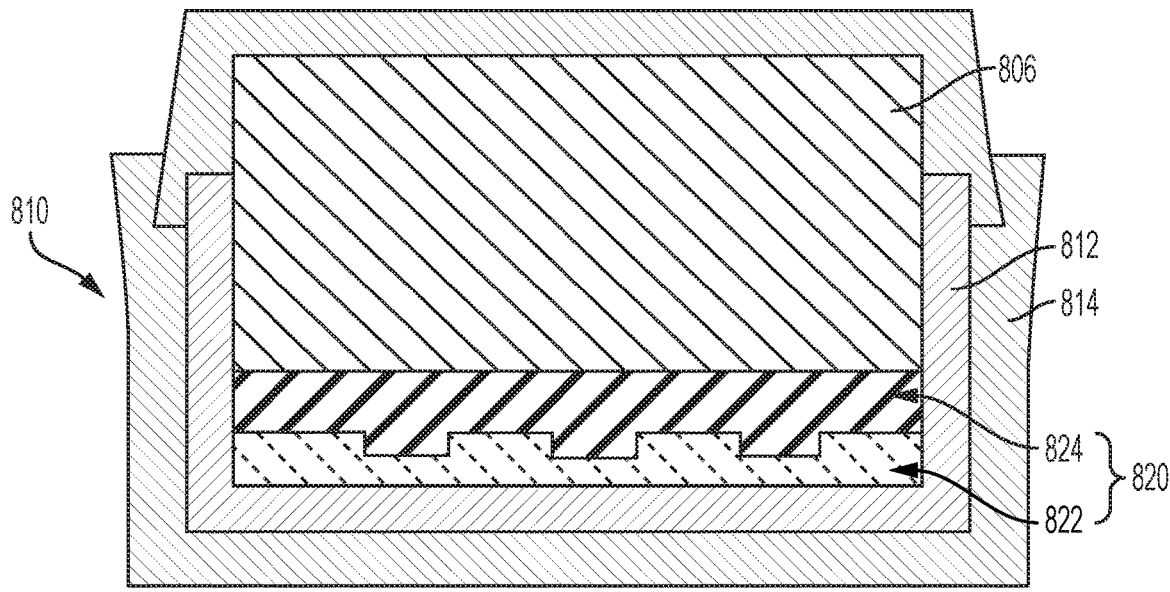

FIGS. 8A and 8B are simplified cross-sectional views illustrating embodiments of an additional method of forming a cutting element including a multi-layered cutting table. With the description provided below, it will be readily apparent to one of ordinary skill in the art that the methods described herein may be used in various devices. In other words, the methods of the disclosure may be used whenever it is desired to form a multi-layered structure, such as a multi-layered structure for an earth-boring tool.

Referring to FIG. 8A, a separately-formed green structure 802, a particulate material 804, a supporting substrate 806, and, optionally, at least one additional structure 808 may be provided into a container 810. The particulate material 804 may be positioned on or over the separately-formed green structure 802, and the supporting substrate 806 may be positioned on or over the separately-formed green structure 802. The additional structure 808, if included, may be positioned between the particulate material 804 and the supporting substrate 806. The container 810 may at least partially surround and hold the separately-formed green structure 802, the particulate material 804, the supporting substrate 806, and the additional structure 808 (if any). The container 810 may include an inner cup 812 in which the separately-formed green structure 802, the particulate material 804, the supporting substrate 806, and the additional structure 808 (if any) may be disposed, and a bottom end piece 814 in which the inner cup 812 may be at least partially disposed. The container 810, including the inner cup 812 and the bottom end piece 814 thereof, may be substantially similar to the container 106 previously described with respect to FIG. 1A.

The separately-formed green structure 802 may have substantially the same material composition and material distribution as the first green structure 116 previously described with respect to FIG. 1B. The separately-formed green structure 802 may, for example, be formed of and include interbonded coated particles 816 substantially similar to (e.g., having substantially the same material composition(s), material distribution(s), dimension(s), shape(s), etc.) the interbonded coated particles 118 previously described with respect to FIGS. 1B and 3. In some embodiments, the separately-formed green structure 802 exhibits substantially non-planar topography including one or more elevated regions and/or one or more recessed regions. For example, as shown in FIG. 8A, the separately-formed green structure 802 may exhibit a non-planar upper surface 817 at least partially defined by one or more elevated regions of the separately-formed green structure 802 and one or more recessed regions of the separately-formed green structure 802. In additional embodiments, the upper surface 817 of the separately-formed green structure 802 exhibits a different non-planar shape, such as one or more of an arcuate shape (e.g., a convex shape, a concave shape), a sinusoidal shape, an angled shape, a jagged shape, a V-shape, a U-shape, and an irregular shape. In further embodiments, the separately-formed green structure 802 exhibits a substantially planar topography (e.g., the upper surface 817 of the separately-formed green structure 802 is substantially planar).

The separately-formed green structure 802 may be formed with or without the use of a separate container. In some embodiments, the separately-formed green structure 802 is formed in a separate container, such as a separate container operatively associated with a pressing device (e.g., a punch and die device), using a process substantially similar to that previously described herein with respect to FIGS. 1A and 1B. In additional embodiments, the separately-formed green structure 802 is formed without the use of a separate container. For example, the separately-formed green structure 802 may be formed by subjecting a first material substantially similar to the first material 102 previously described with respect to FIG. 1A to a pressing process without previously providing or forming the first material within a separate container (e.g., the first material may be compressed using a pressing device without being located in a container).

In some embodiments, the particulate material 804 has substantially the same material composition and material distribution as the first material 102 previously described with respect to FIG. 1A. For example, as shown in FIG. 8A, the particulate material 804 may be formed of and include discrete coated particles 818 each independently having a material composition and a material distribution substantially similar to the coated particles 104 previously described with respect to FIGS. 1A and 2. Each of the discrete coated particles 818 of the particulate material 804 may, for example, independently exhibit a core comprising at least one hard material (e.g., diamond, cubic boron nitride, etc.), and a shell comprising at least one different material (e.g., a metal material, such as a metal catalyst material, an alkali metal carbonate material, an inert metal material, etc.) encapsulating the core. In additional embodiments, the particulate material 804 includes discrete non-composite particles. By way of non-limiting example, the particulate material 804 may include discrete particles of hard material (e.g., diamond, cubic boron nitride, etc.) not encapsulated (e.g., not surrounded, not covered, etc.) by a shell of another material. Put another way, the particulate material 804 may include uncoated particles of hard material. For example, the particulate material 804 may include discrete uncoated particles of hard material instead of or in combination with the discrete coated particles 818.

The shape and dimensions of the particulate material 804 may at least partially depend on the shape and dimensions of the separately-formed green structure 802. The topography of the particulate material 804 may complement (e.g., correspond to) to the topography of the separately-formed green structure 802. For example, if the separately-formed green structure 802 exhibits a substantially non-planar topography, the particulate material 804 may also have a non-planar topography that complements the non-planar topography of the separately-formed green structure 802. By way of non-limiting example, as shown in FIG. 8A, portions of the particulate material 804 may extend over the elevated regions of the separately-formed green structure 802, and additional portions of the particulate material 804 into openings between elevated regions of the separately-formed green structure 802. As another example, if the separately-formed green structure 802 exhibits a substantially planar topography, the particulate material 804 may also exhibit substantially planar topography that complements the planar topography of the separately-formed green structure 802.

The supporting substrate 806 may be substantially similar to (e.g., have substantially the same material composition, material distribution, dimensions, shape, etc.) the supporting substrate 134 previously described with respect to FIG. 1E. In additional embodiments, the supporting substrate 806 may be omitted (e.g., the separately-formed green structure 802 and particulate material 804 may be subjected to subsequent processing, such as subsequent HTHP processing, in the absence of the supporting substrate 806).

The additional structure(s) 808, if any, may have substantially the same material composition and material distribution as one or more of the first material 102 previously described with respect to FIG. 1A, and the additional structure(s) 136 previously described with respect to FIG. 1E. For example, the additional structure(s) 808, if any, may comprise one or more of an additional particulate material formed of and including discrete coated particles, at least one additional separately-formed green structure formed of and including interconnected coated particles, and at least one catalyst-containing structure. In some embodiments, the additional structures 808 are omitted (e.g., absent), and the supporting substrate 806 is provided on the particulate material 804.

Referring next to FIG. 8B, the separately-formed green structure 802 (FIG. 8A), the particulate material 804 (FIG. 8A), the supporting substrate 806 (FIG. 8A) (if any), and the additional structures 808 (FIG. 8A) (if any) may be subjected to at least one HTHP process to form a multi-layered cutting table 820. The multi-layered cutting table 820 may, for example, include a first hard material layer 822 and a second hard material layer 824. The first hard material layer 822 may be formed from the separately-formed green structure 802, and may include interbonded grains of hard material (e.g., diamond, cubic boron nitride, etc.) formed from cores of the interbonded coated particles 816 (FIG. 8A) of the separately-formed green structure 802. The second hard material layer 824 may be formed from the particulate material 804, and may include interbonded grains of hard material (e.g., diamond, cubic boron nitride, etc.) formed from cores of the discrete coated particles 818 (FIG. 8A) of the particulate material 804. Shapes and positions of the first hard material layer 822 and the second hard material layer 824 may correspond to the shapes and positions of the separately-formed green structure 802 and the particulate material 804, respectively. The first hard material layer 822 and the second hard material layer 824 may be densified relative to the separately-formed green structure 802 and the particulate material 804, respectively. The first hard material layer 822 and the second hard material layer 824 may have substantially the same permeability as one another, or the first hard material layer 822 and the second hard material layer 824 may have different permeabilities than one another. In addition, interstitial spaces between interbonded grains of hard material of each of the first hard material layer 822 and the second hard material layer 824 may be at least partially filled with catalyst material (e.g., Co, Fe, Ni, another element from Group VIIIA of the Periodic Table of the Elements, alloys thereof, an alkali metal carbonate, combinations thereof, etc.).

The HTHP process used to form the multi-layered cutting table 820 may also be substantially similar (e.g., employ substantially the same temperature, pressure, duration, etc.) as the HTHP process used to the form the multi-layered cutting table 138 previously described with respect to FIG. 1F.

As previously discussed herein, the methods of the disclosure may be used to form multi-layer cutting tables exhibiting a variety of different dimensions and different shapes. Such multi-layer cutting tables may be employed in cutting elements for earth-boring tools. FIGS. 9 through 12 are partial cut-away perspective views of embodiments of cutting elements including different multi-layer cutting tables that may be formed in accordance with embodiments of the disclosure. While FIGS. 9 through 12 depict particular cutting element configurations, one of ordinary skill in the art will appreciate that different cutting element configurations are known in the art which may be adapted to be employed in embodiments of the disclosure. Namely, FIGS. 9 through 12 illustrate non-limiting examples of cutting element configurations that may be formed using the methods of the disclosure.

Figure 9:
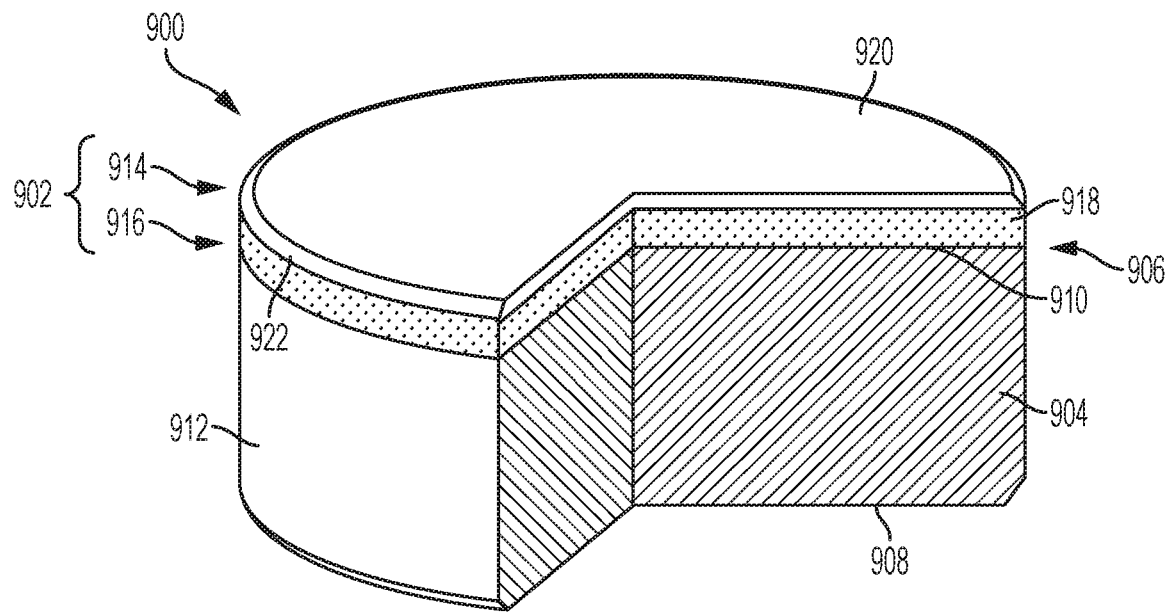
FIGS. 9 through 12 are partial cut-away perspective views of different cutting elements, in accordance with additional embodiments of the disclosure.

FIG. 9 illustrates a cutting element 900 in accordance with embodiments of the disclosure. The cutting element 900 includes a supporting substrate 904, and a multi-layered cutting table 902 bonded to the supporting substrate 904 at an interface 906. The supporting substrate 904 may have substantially the same material composition as the supporting substrate 134 previously described with respect to FIG. 1E, and may exhibit a first end surface 908, a second end surface 910, and a generally cylindrical lateral side surface 912 extending between the first end surface 908 and the second end surface 910. The multi-layered cutting table 902 may be disposed on or over the second end surface 910 of the supporting substrate 904, and may exhibit at least one lateral side surface 918 (also referred to as the "barrel" of the multi-layered cutting table 902), a cutting face 920 (also referred to as the "top" of the multi-layered cutting table 902) opposite the second end surface 910 of the supporting substrate 904, and at least one chamfered edge 922 (and/or at least one arcuate edge) at a periphery of the cutting face 920. In addition, the multi-layered cutting table 902 may include a first hard material layer 914 and a second hard material layer 916. The material composition and the material distribution of the first hard material layer 914 may be substantially similar to the material composition and the material distribution of the first hard material layer 140 previously described with respect to FIG. 1F, and the material composition and the material distribution of the second hard material layer 916 may be substantially similar to the material composition and the material distribution of the second hard material layer 142 previously described with respect to FIG. 1F. As shown in FIG. 9, each of the first hard material layer 914 and the second hard material layer 916 may exhibit a cylindrical column shape. The first hard material layer 914 may longitudinally extend inward from the cutting face 920, and the second hard material layer 916 may be disposed longitudinally between first hard material layer 914 and the supporting substrate 904. The second hard material layer 916 may extend completely laterally across the second end surface 910 of the supporting substrate 904. As depicted in FIG. 9, interfaces between adjacent layers (e.g., the first hard material layer 914 and the second hard material layer 916) of the multi-layered cutting table 902 may be substantially planar. In additional embodiments, one or more interfaces between adjacent layers of the multi-layered cutting table 902 may be non-planar. In addition, while FIG. 9 depicts particular shapes and dimensions of the multi-layered cutting table 902 and the individual components thereof (e.g., first hard material layer 914 and the second hard material layer 916), one or more of the multi-layered cutting table 902 and the individual components thereof may independently exhibit a different structural configuration (e.g., a different shape and/or different dimensions). For example, in additional embodiments, one or more of the multi-layered cutting table 902 and the individual components thereof may independently exhibit a different shape (e.g., a conical shape; a pyramidal shape; a cubic shape; cuboidal shape; a spherical shape; a hemispherical shape; a cylindrical shape; an annular shape; a semi-cylindrical shape; an irregular shape, such as a complex shape complementary to any structures adjacent thereto; etc.), a different size, and/or a different arrangement than that depicted in FIG. 9.

Figure 10:
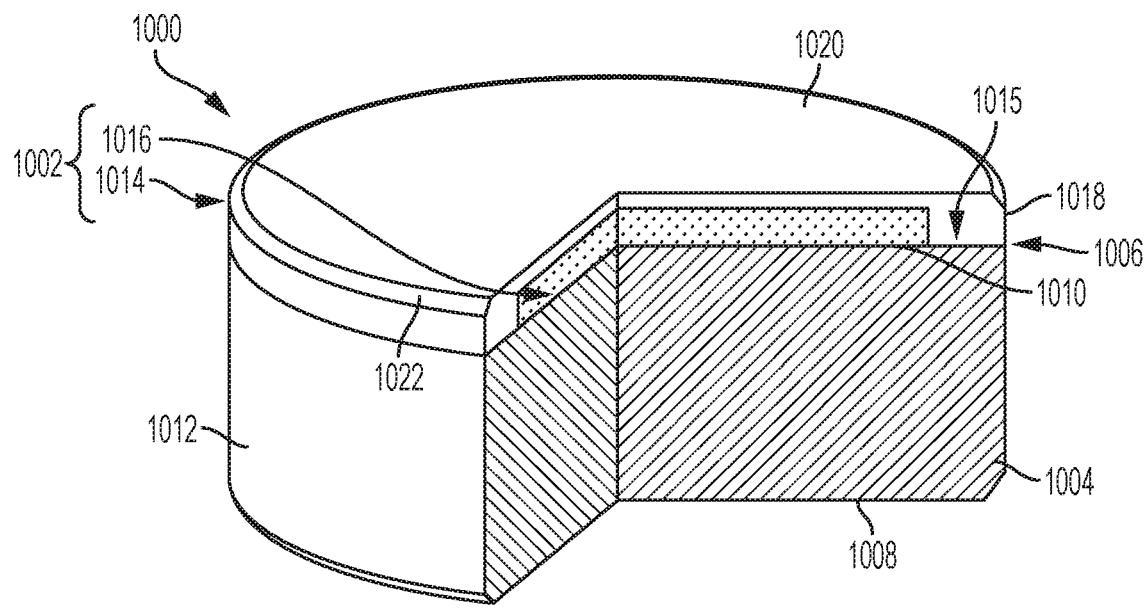

FIG. 10 illustrates a cutting element 1000 in accordance with additional embodiments of the disclosure. To avoid repetition, not all features shown in FIG. 10 are described in detail herein. Rather, unless described otherwise below, features designated by a reference numeral that is a 100 increment of the reference numeral of a feature described previously in relation to FIG. 9 will be understood to be substantially similar to the feature described previously. The cutting element 1000 includes a supporting substrate 1004, and a multi-layered cutting table 1002 bonded to the supporting substrate 1004 at an interface 1006. The multi-layered cutting table 1002 may include a first hard material layer 1014 and a second hard material layer 1016. The first hard material layer 1014 may extend longitudinally inward from a cutting face 1020 of the multi-layered cutting table 1002, and may also extend laterally inward from a lateral side surface 1018 of the multi-layered cutting table 1002. An annular extension 1015 of the first hard material layer 1014 may extend toward the supporting substrate 1004 at a lateral periphery of the multi-layered cutting table 1002. In some embodiments, the annular extension 1015 may abut the supporting substrate 1004 at one or more portion(s) of the interface 1006. The first hard material layer 1014 may at least partially surround the second hard material layer 1016. In turn, the second hard material layer 1016 may be disposed between a portion of the first hard material layer 1014 and the supporting substrate 1004. As depicted in FIG. 10, the first hard material layer 1014 may substantially circumscribe upper and lateral (e.g., radially outer) portions of the second hard material layer 1016. Accordingly, in some embodiments, the second hard material layer 1016 does not extend (e.g., laterally extend, and/or longitudinally extend) to the periphery (e.g., the cutting face 1020, a chamfered edge 1022, and the lateral side surface 1018) of the multi-layered cutting table 1002. In further embodiments, a portion of the second hard material layer 1016 may be located between at least a portion of the annular extension 1015 of first hard material layer 1014 and the supporting substrate 1004. The portion of the second hard material layer 1016 may extend to the lateral side surface 1018 of the multi-layered cutting table 1002, or may not extend to the lateral side surface 1018 of the multi-layered cutting table 1002. As depicted in FIG. 10, interfaces between adjacent layers (e.g., the first hard material layer 1014 and the second hard material layer 1016) of the multi-layered cutting table 1002 may be substantially planar. In additional embodiments, one or more interfaces between adjacent layers of the multi-layered cutting table 1002 may be non-planar. In addition, while FIG. 10 depicts particular shapes and dimensions of the multi-layered cutting table 1002 and the individual components thereof (e.g., first hard material layer 1014 and the second hard material layer 1016), one or more of the multi-layered cutting table 1002 and the individual components thereof may independently exhibit a different structural configuration (e.g., a different shape and/or different dimensions). For example, in additional embodiments, one or more of the multi-layered cutting table 1002 and the individual components thereof may independently exhibit a different shape (e.g., a conical shape; a pyramidal shape; a cubic shape; cuboidal shape; a spherical shape; a hemispherical shape; a cylindrical shape; an annular shape; a semi-cylindrical shape; an irregular shape, such as a complex shape complementary to any structures adjacent thereto; etc.), a different size, and/or a different arrangement than that depicted in FIG. 10.

Figure 11:
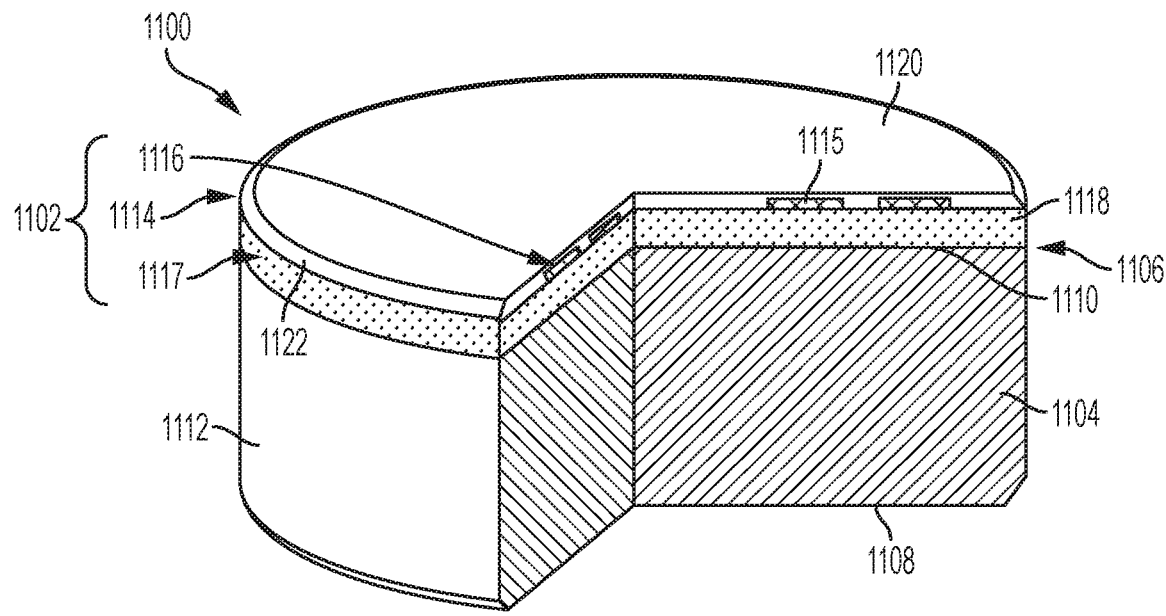

FIG. 11 illustrates a cutting element 1100 in accordance with additional embodiments of the disclosure. To avoid repetition, not all features shown in FIG. 11 are described in detail herein. Rather, unless described otherwise below, features designated by a reference numeral that is a 100 increment of the reference numeral of a feature described previously in relation to FIG. 9 will be understood to be substantially similar to the feature described previously. The cutting element 1100 includes a supporting substrate 1104, and a multi-layered cutting table 1102 bonded to the supporting substrate 1004 at an interface 1006. The multi-layered cutting table 1102 may include a first hard material layer 1114, a second hard material layer 1116, and a third hard material layer 1117. The first hard material layer 1114 may extend longitudinally inward from a cutting face 1120 of the multi-layered cutting table 1102, and may at least partially surround the second hard material layer 1016. As shown in FIG. 11, the second hard material layer 1116 may comprise one or more discrete structures surrounded by one or more portions of the first hard material layer 1114. For example, the first hard material layer 1114 may laterally intervene between and separate portions of the second hard material layer 1116. As depicted in FIG. 11, the first hard material layer 1114 may substantially circumscribe upper and lateral (e.g., radially outer) portions of the separate portions of the second hard material layer 1116. Accordingly, the multi-layered cutting table 1102 may exhibit a non-planar interface 1115 between the first hard material layer 1114 and the second hard material layer 1116. The second hard material layer 1116 may longitudinally intervene between portions of the first hard material layer 1114 and the third hard material layer 1117. In addition, as shown in FIG. 11, the third hard material layer 1117 may be disposed between the supporting substrate 1104 and each of the first hard material layer 1114 and the second hard material layer 1116. As depicted in FIG. 11, an interface 1118 between the third hard material layer 1117 and each of the first hard material layer 1114 and the second hard material layer 1116 may be substantially planar. In additional embodiments, the interface 1118 between the third hard material layer 1117 and one or more of the first hard material layer 1114 and the second hard material layer 1116 may be substantially non-planar. In addition, while FIG. 11 depicts particular shapes and dimensions of the multi-layered cutting table 1102 and the individual components thereof (e.g., the first hard material layer 1114, the second hard material layer 1116, and the third hard material layer 117), one or more of the multi-layered cutting table 1102 and the individual components thereof may independently exhibit a different structural configuration (e.g., a different shape and/or different dimensions). For example, in additional embodiments, one or more of the multi-layered cutting table 1102 and the individual components thereof may independently exhibit a different shape (e.g., a conical shape; a pyramidal shape; a cubic shape; cuboidal shape; a spherical shape; a hemispherical shape; a cylindrical shape; an annular shape; a semi-cylindrical shape; an irregular shape, such as a complex shape complementary to any structures adjacent thereto; etc.), a different size, and/or a different arrangement than that depicted in FIG. 11.

Figure 12:
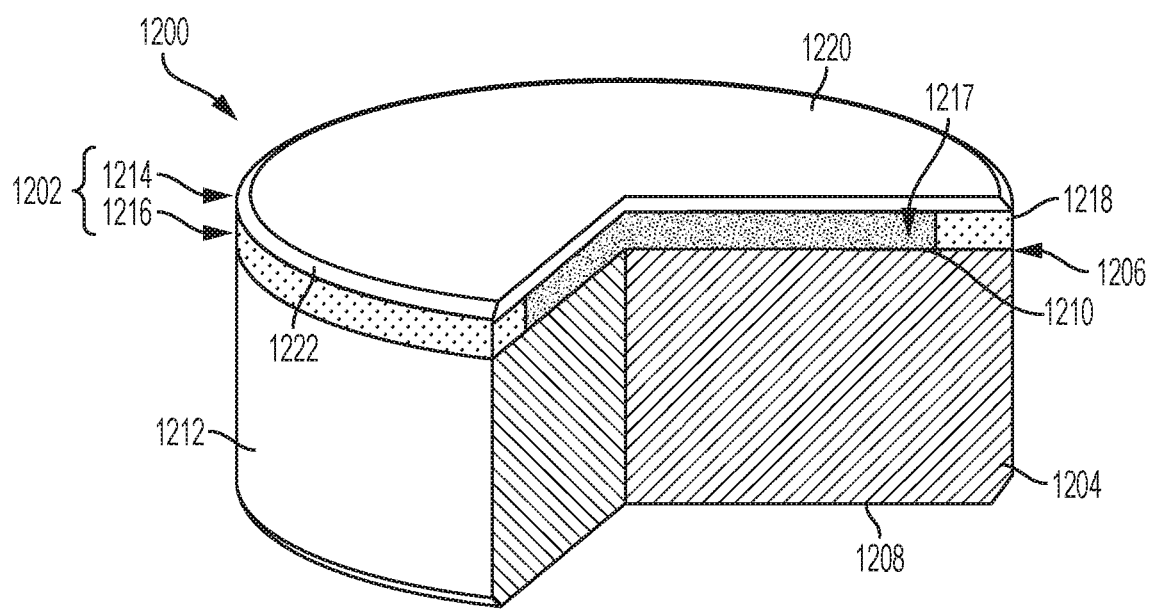

FIG. 12 illustrates a cutting element 1200 in accordance with additional embodiments of the disclosure. To avoid repetition, not all features shown in FIG. 12 are described in detail herein. Rather, unless described otherwise below, features designated by a reference numeral that is a 100 increment of the reference numeral of a feature described previously in relation to FIG. 12 will be understood to be substantially similar to the feature described previously. The cutting element 1200 includes a supporting substrate 1204, and a multi-layered cutting table 1202 bonded to the supporting substrate 1204 at an interface 1206. The multi-layered cutting table 1202 may include a first hard material layer 1214 and a second hard material layer 1216. The first hard material layer 1214 may exhibit a cylindrical column shape, and the second hard material layer 1216 may exhibit an annular shape. The first hard material layer 1214 may extend longitudinally inward from a cutting face 1220 of the multi-layered cutting table 1202. The second hard material layer 1216 may be disposed longitudinally between a portion of the first hard material layer 1214 and a portion of the supporting substrate 1204, and may extend laterally inward from a lateral side surface 1218 of the multi-layered cutting table 1202. As shown in FIG. 12, inner surfaces of the first hard material layer 1214 and the second hard material layer 1216 may at least partially define a cavity 1217 within the multi-layered cutting table 1202. The cavity 1217 may be disposed longitudinally between the first hard material layer 1214 and the supporting substrate 1204. The cavity 1217 may, for example, be sized and shaped to receive and hold one or more of at least one device or at least one structure, such as at least one sensor device. The sensor device may, for example, be configured and operated to obtain and communicate (e.g., relay, transmit, send, transfer, etc.) information (e.g., pressure information, temperature information, wear information, velocity information, acceleration information, etc.) related to the use and operation of the cutting element 1200. As depicted in FIG. 12, interfaces between adjacent layers (e.g., the first hard material layer 1214 and the second hard material layer 1216) of the multi-layered cutting table 1202 may be substantially planar. In additional embodiments, one or more interfaces between adjacent layers of the multi-layered cutting table 1202 may be non-planar. In addition, while FIG. 12 depicts particular shapes and dimensions of the multi-layered cutting table 1202 and the individual components thereof (e.g., the first hard material layer 1214, the second hard material layer 1216, and the cavity 1217), one or more of the multi-layered cutting table 1202 and the individual components thereof may independently exhibit a different structural configuration (e.g., a different shape and/or different dimensions). For example, in additional embodiments, one or more of the multi-layered cutting table 1202 and the individual components thereof may independently exhibit a different shape (e.g., a conical shape; a pyramidal shape; a cubic shape; cuboidal shape; a spherical shape; a hemispherical shape; a cylindrical shape; an annular shape; a semi-cylindrical shape; an irregular shape, such as a complex shape complementary to any structures adjacent thereto; etc.), a different size, and/or a different arrangement than that depicted in FIG. 12.

Figure 13:
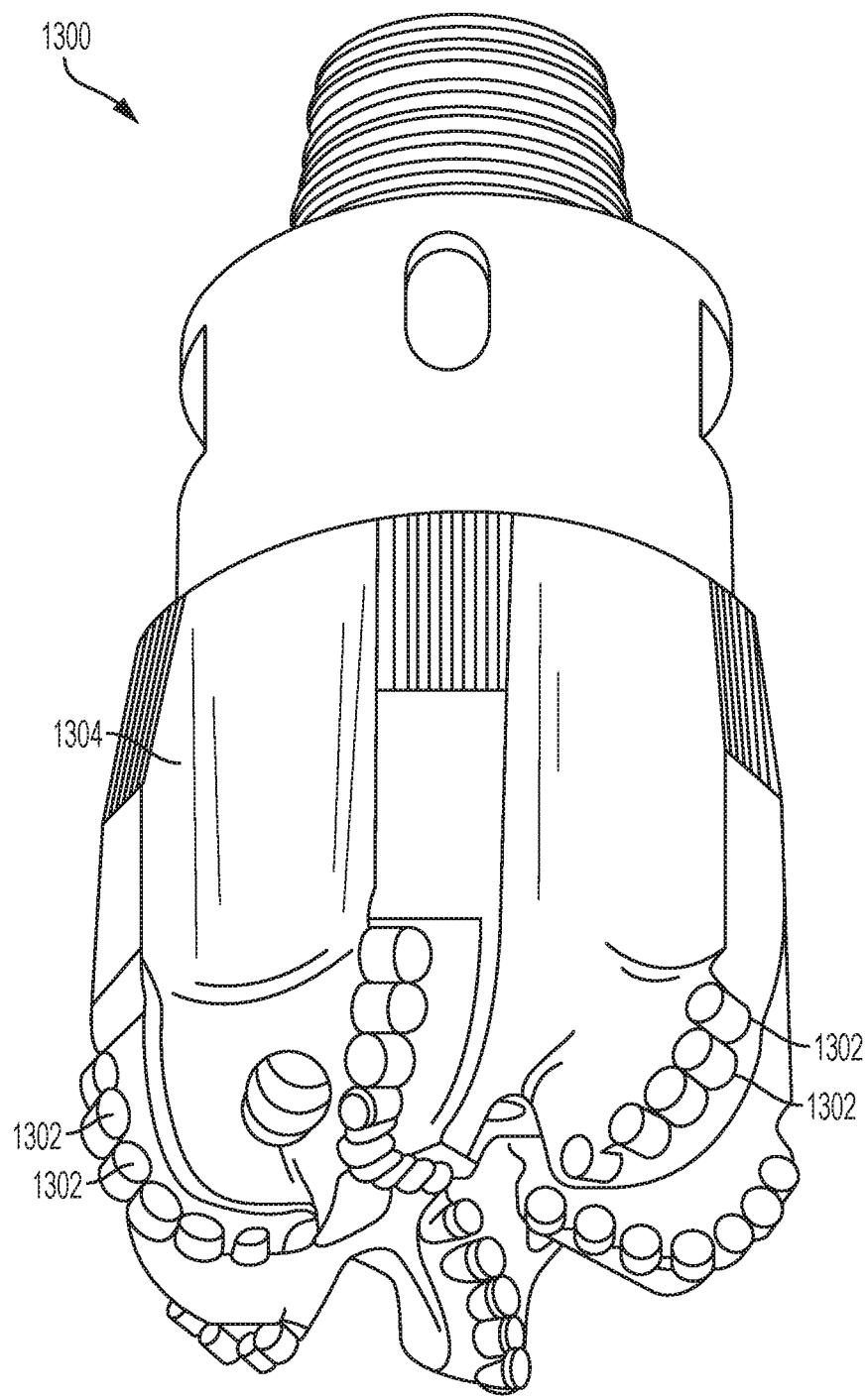
FIG. 13 is a perspective view of an embodiment of a fixed-cutter earth-boring rotary drill bit including a cutting element of the disclosure.

Embodiments of cutting elements (e.g., the cutting elements 900, 1000, 1100, 1200 illustrated in FIGS. 9 through 12) described herein may be secured to an earth-boring tool and used to remove subterranean formation material in accordance with additional embodiments of the disclosure. The earth-boring tool may, for example, be a rotary drill bit, a percussion bit, a coring bit, an eccentric bit, a reamer tool, a milling tool, etc. As a non-limiting example, FIG. 13 illustrates a fixed-cutter type earth-boring rotary drill bit 1300 that includes cutting elements 1302. The cutting elements 1302 may be substantially similar to one or more of the cutting elements 900, 1000, 1100, and 1200, as previously described herein with respect to FIGS. 9 through 12, and may be formed in accordance to one or more of the methods previously described herein with respect to FIGS. 1A through 1F; FIGS. 6A through 6D; FIGS. 7A and 7B; and FIGS. 8A and 8B. The rotary drill bit 1300 includes a bit body 1304, and the cutting elements 1302 are attached to the bit body 1304. The cutting elements 1302 may, for example, be brazed, welded, or otherwise secured, within pockets formed in an outer surface of the bit body 1304.

While the disclosure has been described herein with respect to certain example embodiments, those of ordinary skill in the art will recognize and appreciate that it is not so limited. Rather, many additions, deletions and modifications to the embodiments described herein may be made without departing from the scope of the disclosure as hereinafter claimed. In addition, features from one embodiment may be combined with features of another embodiment while still being encompassed within the scope of the disclosure. Further, the disclosure has utility in drill bits having different bit profiles as well as different cutter types.

What is claimed is:

1. A method of forming a cutting element, comprising:
disposing a first material comprising discrete coated particles within a container;
pressing the first material to form a first green structure comprising interbonded coated particles;
disposing a second material comprising additional discrete coated particles over the first green structure within the container;
pressing the second material to form a second green structure comprising additional interbonded coated particles; and
sintering the first green structure and the second green structure to form a multi-layered cutting table.

2. The method of claim 1, wherein disposing a first material comprising discrete coated particles within a container comprises selecting each of the discrete coated particles to independently comprise a core comprising hard material encapsulated by a shell comprising metal material.

3. The method of claim 2, wherein selecting each of the discrete coated particles to independently comprise a core comprising hard material encapsulated by a shell comprising metal material comprises selecting each of the discrete coated particles to independently comprise a diamond particle substantially surrounded by a catalyst metal material.

4. The method of claim 1, wherein disposing a second material comprising additional discrete coated particles over the first green structure within the container comprises selecting each of the additional discrete coated particles to independently comprise a core of a hard material encapsulated by a shell of a metal material.

5. The method of claim 4, wherein selecting each of the additional discrete coated particles to independently comprise a core comprising hard material encapsulated by a shell comprising a metal material comprises selecting each of the additional discrete coated particles to independently comprise a diamond particle at least substantially surrounded by a catalyst metal material.

6. The method of claim 1, wherein pressing the first material to form a first green structure comprises forming the first green structure to exhibit a substantially non-planar topography.

7. The method of claim 1, wherein:
pressing the first material to form a first green structure comprising interbonded coated particles comprises pressing the first material to directly physically connect shells of the discrete coated particles to one another; and
pressing the second material to form a second green structure comprising additional interbonded coated particles comprises pressing the second material to directly physically connect shells of the additional discrete coated particles to one another.

8. The method of claim 1, further comprising disposing a supporting substrate over the second green structure prior to sintering the first green structure and the second green structure.

9. The method of claim 1, further comprising forming the discrete coated particles to individually comprise a core comprising diamond encapsulated by a shell comprising one or more of zirconium, hafnium, niobium, and tantalum.

10. The method of claim 1, further comprising forming the discrete coated particles to individually comprise a core comprising diamond encapsulated by a heterogeneous shell comprising a first metal material on the core and a second metal material substantially surrounding the first metal material and having a different material composition than the first metal material.

11. A method of forming a cutting element, comprising:
disposing a first green structure comprising interbonded coated diamond particles into a container;
disposing a second green structure comprising additional interbonded coated particles over the first green structure within the container; and
sintering the first green structure and the second green structure to form a multi-layered cutting table.

12. The method of claim 11, further comprising pressing a first material comprising discrete coated particles outside of the container to form the first green structure.

13. The method of claim 12, further comprising selecting each of the discrete coated particles to independently comprise a core comprising diamond encapsulated by a shell comprising a metal material.

14. The method of claim 11, further comprising forming the interbonded coated diamond particles of the first green structure to comprise discrete diamond particles surrounded by a matrix comprising a metal material.

15. The method claim 11, further comprising pressing a second material comprising discrete coated particles outside of the container to form the second green structure.

16. The method of claim 11, wherein disposing a second green structure comprising additional interbonded coated particles over the first green structure within the container comprises disposing the second green structure into the container separate from the first green structure.

17. The method of claim 11, further comprising coupling the second green structure to the first green structure prior to disposing the first green structure into the container.

18. The method of claim 15, further comprising selecting each of the discrete coated particles to independently comprise a core comprising diamond encapsulated by a shell comprising a metal material.

19. The method of claim 11, further comprising forming the additional interbonded coated diamond particles of the second green structure to comprise discrete diamond particles surrounded by a matrix comprising a metal material.

20. A method of forming a cutting element, comprising:
disposing at least one green structure comprising interbonded coated diamond particles into a container;
disposing at least one particulate material comprising discrete coated diamond particles adjacent the at least one green structure within the container; and
sintering the at least one green structure and the at least one particulate material to form a multi-layered cutting table.

21. The method of claim 20, further comprising pressing at least one additional particulate material comprising additional discrete coated diamond particles outside of the container to form the at least one green structure, each of the additional discrete coated diamond particles of the at least one additional particulate material independently comprising a core comprising diamond material encapsulated by a shell comprising metal material.

22. The method of claim 20, wherein disposing at least one particulate material comprising discrete coated diamond particles adjacent the at least one green structure within the container comprises selecting the at least one particulate material to comprise discrete coated diamond particles each independently comprising a core comprising diamond material encapsulated by a shell comprising metal material.

23. A method of forming a cutting element, comprising:
disposing a first material comprising discrete coated particles within a container;
pressing the first material to form a green structure comprising interbonded coated particles;
disposing a second material adjacent the green structure within the container; and
sintering the green structure and the second material to form a multi-layered cutting table.

24. The method of claim 23, wherein disposing a first material comprising discrete coated particles adjacent the green structure within a container comprises selecting each of the discrete coated particles to independently comprise a core comprising hard material encapsulated by a shell comprising metal material.

25. The method of claim 23, wherein pressing the first material to form a green structure comprising interbonded coated particles comprises pressing the first material to directly physically connect shells of the discrete coated particles to one another.

26. The method of claim 23, wherein disposing a second material adjacent the green structure within the container comprises selecting the second material to comprise additional discrete coated particles each independently comprising a core comprising hard material encapsulated by a shell comprising metal material.

27. The method of claim 23, wherein disposing a second material adjacent the green structure within the container comprises selecting the second material to comprise discrete uncoated particles of hard material.

* * * * *

UNITED STATES PATENT AND TRADEMARK OFFICE
CERTIFICATE OF CORRECTION

PATENT NO. : 10,605,008 B2  
APPLICATION NO. : 15/462249  
DATED : March 31, 2020  
INVENTOR(S) : Aaron J. Dick It is certified that error appears in the above-identified patent and that said Letters Patent is hereby corrected as shown below:

In the Specification  
 Column 10, Line 67, change "combinations thereof In" to --combinations thereof. In--  
 Column 24, Line 65, change "to FIG. IF." to --to FIG. 1F.--

In the Claims  
Claim 11, Column 33, Line 43, change "interbonded coated particles" to --interbonded coated diamond particles--

Signed and Sealed this  
Twelfth Day of May, 2020

Andrei Iancu  
*Director of the United States Patent and Trademark Office*